(12) United States Patent
Kalenian

(10) Patent No.: US 9,549,635 B1
(45) Date of Patent: Jan. 24, 2017

(54) SEMI-CONTINUOUS APPARATUS FOR CREATING AN EXTRACT FROM COFFEE OR OTHER EXTRACTABLE MATERIALS

(71) Applicant: Meltz, LLC, Ipswich, MA (US)

(72) Inventor: Paul Kalenian, Santa Fe, NM (US)

(73) Assignee: Meltz, LLC, Ipswich, MA (US)

( * ) Notice: Subject to any disclaimer, the term of this patent is extended or adjusted under 35 U.S.C. 154(b) by 0 days.

(21) Appl. No.: 15/142,845

(22) Filed: Apr. 29, 2016

Related U.S. Application Data

(62) Division of application No. 14/814,167, filed on Jul. 30, 2015.

(51) Int. Cl.
| | |
|---|---|
| *A47J 31/44* | (2006.01) |
| *A47J 31/04* | (2006.01) |
| *A23F 5/12* | (2006.01) |
| *A23F 5/32* | (2006.01) |
| *A23F 5/26* | (2006.01) |

(52) U.S. Cl.
CPC ............ *A47J 31/4403* (2013.01); *A23F 5/12* (2013.01); *A23F 5/262* (2013.01); *A23F 5/267* (2013.01); *A23F 5/32* (2013.01); *A47J 31/04* (2013.01)

(58) Field of Classification Search
CPC ........ A47J 31/04; A47J 31/4403; A23F 5/262; A23F 5/12; A23F 5/32; A23F 5/267
See application file for complete search history.

(56) References Cited

U.S. PATENT DOCUMENTS 1,478,908 A    12/1923   Oldham
2,155,971 A *  4/1939   Houseman .............. A23F 5/262
                                                                                                                                     426/386

(Continued)

FOREIGN PATENT DOCUMENTS

| CA | 1157310 A | 11/1983 |
|---|---|---|
| CA | 2087242 A1 | 7/1993 |

(Continued)

OTHER PUBLICATIONS

International Search Report issued by the European Patent Office for International Application No. PCT/US00/29651 mailed Jun. 19, 2001 (6 pgs.).

(Continued)

*Primary Examiner* — Anthony Weier
(74) *Attorney, Agent, or Firm* — Wilmer Cutler Pickering Hale and Dorr LLP

(57) ABSTRACT

The techniques provide for a reconfigurable extraction column length based on the number of columns from a plurality of columns configured for use in an extraction apparatus. The apparatus includes a plurality of columns that each have an inlet, a central portion configured to hold extractable material during an extraction process, and an outlet. The reconfigurable extraction apparatus also includes a piping system connected to each of the plurality of columns that can selectively connect each of the plurality of columns, such that each column from the plurality of columns can be configured for an extraction process either singularly or in series or in parallel with one or more other columns from the plurality of columns, administering a solvent to one or more of the plurality of columns, and outputting the solvent after an extraction process occurs in the one or more of the plurality of columns.

20 Claims, 10 Drawing Sheets

(56) References Cited

U.S. PATENT DOCUMENTS

| | | | |
|---|---|---|---|
| 2,324,526 A * | 7/1943 | Rudolf | A23F 5/185 |
| | | | 159/4.08 |
| 2,620,276 A | 12/1952 | Heyman | |
| 2,887,038 A | 5/1959 | Axel | |
| 3,228,876 A | 1/1966 | Mahon | |
| 3,261,507 A | 7/1966 | Cornelius | |
| 3,349,691 A | 10/1967 | Austin et al. | |
| 3,458,320 A | 7/1969 | Niven | |
| 3,484,245 A | 12/1969 | Goto | |
| 3,582,351 A | 6/1971 | Austin et al. | |
| 3,607,280 A | 9/1971 | Durchholz | |
| 3,655,398 A * | 4/1972 | Pitchon | A23F 5/262 |
| | | | 422/261 |
| 3,682,649 A | 8/1972 | Orozovich | |
| 3,700,466 A | 10/1972 | Bergeron et al. | |
| 3,762,930 A | 10/1973 | Mahlmann | |
| 3,769,033 A | 10/1973 | Panzer et al. | |
| 3,788,860 A | 1/1974 | Mahlmann | |
| 3,790,689 A | 2/1974 | Pitchon et al. | |
| 3,799,049 A * | 3/1974 | Smith, Jr. | A23F 5/12 |
| | | | 99/470 |
| 3,800,055 A | 3/1974 | Gallagher | |
| 3,830,940 A | 8/1974 | Sivetz | |
| 3,843,824 A | 10/1974 | Roselius et al. | |
| 3,908,033 A | 9/1975 | Ganiaris | |
| 3,995,067 A | 11/1976 | Marsh et al. | |
| 3,997,685 A * | 12/1976 | Strobel | A23F 3/426 |
| | | | 422/261 |
| 4,105,802 A | 8/1978 | Cho et al. | |
| 4,156,031 A | 5/1979 | Hamell et al. | |
| 4,158,329 A | 6/1979 | McKnight | |
| 4,189,991 A | 2/1980 | Haddad | |
| 4,226,891 A | 10/1980 | Lewis | |
| 4,276,315 A | 6/1981 | Katz et al. | |
| 4,277,509 A | 7/1981 | Wouda | |
| 4,310,468 A | 1/1982 | Reiners | |
| 4,352,829 A | 10/1982 | Noyes et al. | |
| 4,414,113 A | 11/1983 | LaTerra | |
| 4,505,191 A | 3/1985 | Longo | |
| 4,534,985 A | 8/1985 | Gasau | |
| 4,579,048 A | 4/1986 | Stover | |
| 4,633,771 A | 1/1987 | Anderl | |
| 4,721,035 A | 1/1988 | Chang-Diaz | |
| 4,853,234 A | 8/1989 | Bentley et al. | |
| 4,882,982 A | 11/1989 | Muttoni | |
| 4,929,462 A | 5/1990 | Moorman et al. | |
| 4,998,462 A | 3/1991 | Sekiguchi | |
| 5,041,245 A | 8/1991 | Benado | |
| 5,043,178 A | 8/1991 | Gottesman et al. | |
| 5,114,728 A | 5/1992 | Ben-Nasr et al. | |
| 5,114,731 A | 5/1992 | Belville et al. | |
| 5,127,318 A | 7/1992 | Selby, III | |
| 5,151,287 A * | 9/1992 | Schlecht | A23F 5/267 |
| | | | 426/432 |
| 5,168,794 A | 12/1992 | Glucksman | |
| 5,204,136 A | 4/1993 | Hellemons | |
| 5,230,278 A | 7/1993 | Bunn et al. | |
| 5,242,700 A | 9/1993 | Schlecht | |
| 5,255,593 A | 10/1993 | Bunn et al. | |
| 5,267,506 A | 12/1993 | Cai | |
| 5,297,472 A | 3/1994 | Suzuki et al. | |
| 5,301,694 A | 4/1994 | Raymond et al. | |
| 5,303,639 A | 4/1994 | Bunn et al. | |
| 5,337,652 A | 8/1994 | Fischer et al. | |
| 5,353,692 A | 10/1994 | Reese et al. | |
| 5,372,832 A | 12/1994 | Bunn et al. | |
| 5,393,540 A | 2/1995 | Bunn et al. | |
| 5,473,973 A | 12/1995 | Cortese | |
| 5,497,792 A | 3/1996 | Prasad et al. | |
| 5,525,746 A | 6/1996 | Franke | |
| 5,637,343 A | 6/1997 | Ryan, Jr. | |
| 5,638,740 A | 6/1997 | Cai | |
| 5,699,719 A | 12/1997 | Lucas et al. | |
| 5,704,950 A | 1/1998 | Putatunda | |
| 5,707,673 A | 1/1998 | Prevost et al. | |
| 5,739,364 A | 4/1998 | Franke | |
| 5,778,765 A | 7/1998 | Klawuhn et al. | |
| 5,897,899 A | 4/1999 | Fond | |
| 5,901,636 A | 5/1999 | Witziers et al. | |
| 6,102,213 A | 8/2000 | Gurol | |
| 6,203,837 B1 | 3/2001 | Kalenian | |
| 6,224,683 B1 | 5/2001 | Tanikawa et al. | |
| 6,548,094 B2 | 4/2003 | Kalenian | |
| 6,887,506 B2 | 5/2005 | Kalenian | |
| 7,419,692 B1 | 9/2008 | Kalenian | |
| 7,875,304 B2 | 1/2011 | Kalenian | |
| 2003/0118707 A1 | 6/2003 | Kalenian | |
| 2005/0112253 A1 | 5/2005 | Kalenian | |
| 2006/0273013 A1 | 12/2006 | Chin et al. | |

FOREIGN PATENT DOCUMENTS

| | | |
|---|---|---|
| CN | 1071810 A | 5/1993 |
| CN | 102816875 A | 12/2012 |
| DE | 3318317 A1 | 11/1984 |
| DE | 19706005 A1 | 8/1998 |
| EP | 0256567 A2 | 2/1988 |
| EP | 0412496 A2 | 2/1991 |
| EP | 0812558 A1 | 12/1997 |
| EP | 0893065 A2 | 1/1999 |
| EP | 1787523 A2 | 5/2007 |
| GB | 691845 A | 5/1953 |
| JP | H01194915 A | 8/1989 |
| JP | 02138938 | 5/1990 |
| JP | H02119748 A | 5/1990 |
| JP | H04088948 | 3/1992 |
| JP | 04045747 B2 | 2/2008 |
| NL | 6803767 A | 5/1968 |
| WO | WO-0019833 A2 | 4/2000 |
| WO | WO-0130173 A2 | 5/2001 |

OTHER PUBLICATIONS

International Search Report issued by the European Patent Office for International Application No. PCT/US99/23178 mailed Oct. 24, 2000 (7 pgs.).

Sheu, M.J. and Wiley, R.C., "Preconcentration of Apple Juice by Reverse Osmosis", Journal of Food Science, vol. 48, No. 2, pp. 422-429 (1983).

International Search Report and Written Opinion for International Application No. PCT/US2016/044209 mailed Oct. 11, 2016 (11 pages).

* cited by examiner

SEMI-CONTINUOUS APPARATUS FOR CREATING AN EXTRACT FROM COFFEE OR OTHER EXTRACTABLE MATERIALS

RELATED APPLICATIONS

This application is a divisional of and claims priority under 35 U.S.C. §120 to U.S. patent application Ser. No. 14/814,167, entitled "SEMI-CONTINUOUS PROCESSES AND APPARATUS FOR CREATING AN EXTRACT FROM COFFEE OR OTHER EXTRACTABLE MATERIALS", filed Jul. 30, 2015, which is hereby incorporated by reference herein in its entirety.

TECHNICAL FIELD

The technical field relates generally to a semi-continuous process and apparatus for creating an extract from coffee or other extractable materials.

BACKGROUND

A counterflow process is a common technique to extract soluble compounds from solids, such as to extract flavor, aroma and caffeine compounds from coffee grounds. Counterflow systems are often characterized as those having two flows of different compounds, e.g., some combination of gases, liquids and solids, traveling in opposite directions (or holding one stationary while the other flows around or through it). They can be designed to maximize the exchange of certain properties (e.g., heat or dissolvable solids concentration) from one flow or compound to the other and they achieve this by maintaining an essentially constant gradient between the two over the entire length of the flow system. For example, in a counterflow coffee extraction system, the difference in concentration of certain desirable dissolvable solids between a solvent (e.g., water) and a solid (e.g., coffee grounds) remains generally similar from one end of the extraction column or system to the other. In parallel flow systems, the gradient between the two is often initially very high, but drops off quickly along the length of the flow path.

Traditional counterflow processes for some compounds, e.g., coffee extraction, can be negatively affected by uncontrolled conditions such as under extraction (e.g., which can result in loss of revenue), over extraction (e.g., hydrolysis of cellulose fibers leading to bitter taste and shelf unstable extracts), inadequate column length (e.g., inadequate total dissolved solids ("TDS") leading to the need for concentrating post extraction), and/or plugged column(s) (e.g., which can cause a loss of flow, revenue loss and excessive extraction times).

Many such extraction systems can be difficult to load, unload and/or clean. For example, some extraction systems can leave behind a slurry of wet grinds that needs to be de-watered post-extraction prior to disposal and/or reuse elsewhere as fuel or nutrients or landfill. Extraction columns can be wet-flushed, but this process requires re-wetting the spent grinds, which can make evacuation easier, but at the expense of producing wet, spent grinds that need additional processing to become recyclable (e.g., into fuel or soil nutrients).

Many extraction systems are of either the batch type or the continuous type, and typically offer the operator limited options while processing desired extracts (e.g., in terms of TDS and volume). None of the current systems are versatile enough to provide most of the benefits of both the batch and continuous type and with a selectable column length that is both heatable and coolable.

Many extraction systems are also often unable to simply bypass areas of the extraction column that are either spent or plugged or have developed channel flows. These systems typically offer less than optimal control of the various aspects of extraction, including being in control of contact time, temperature, pressure, dry spotting, and/or under or over extraction.

Some extraction methods are based a cold extraction process where ground coffee is simply soaked in cold water while held in a cloth sack for an extended time period. This method is microbially unstable, and the resulting cold brew coffee has a taste that is quite different from hot brewed coffee, which is often the standard to be met.

Some extraction methods may use a solvent that is too hot, resulting in, for example, breakdown (e.g., hydrolysis) of the cellulose present in a coffee bean and/or inclusion of the coffee bean's woody fiber in the extract.

SUMMARY

The processes and apparatus described herein provide for selectable methods of operation such that the apparatus can be configured to utilize any one of a number of columns to achieve a reconfigurable extraction process. The techniques also allow for a level of user controls that can be configured to yield, for example, laboratory-level precision in the extraction of the critical 15-20% of a coffee bean that constitutes desirable flavor and fragrance compounds. The techniques can provide for extraction at somewhat "normal" brew temperatures. The techniques can manage temperature, pressure and/or contact time, in a series of columns of controlled length, that offer easy loading, unloading and cleaning that is optimized for industrial extraction.

The disclosed subject matter includes a reconfigurable extraction apparatus. The reconfigurable extraction apparatus includes a plurality of columns, wherein each column of the plurality of columns includes an inlet into the column configured to provide an extractable material into the column, a central portion configured to hold the extractable material during an extraction process, and an outlet out of the column configured to expend exhausted extraction material. The reconfigurable extraction apparatus includes a piping system connected to each of the plurality of columns, wherein the piping system is configured to provide for selectively connecting each of the plurality of columns, such that each column from the plurality of columns can be configured for an extraction process either singularly or in series or in parallel with one or more other columns from the plurality of columns, administering a solvent to one or more of the plurality of columns, and outputting the solvent after an extraction process occurs in the one or more of the plurality of columns, wherein the piping system and plurality of columns provides for a reconfigurable extraction column length based on the number of columns from the plurality of columns configured for use in the extraction apparatus.

In some examples, the plurality of columns are configured vertically such that, for each column from the plurality of columns, the solvent inlet into the column is disposed at the top of the column and the solvent outlet is disposed at the bottom of the column such that the solvent can flow through the column from the top of the column to the bottom of the column.

In some examples, the plurality of columns are configured vertically such that, for each column from the plurality of columns, the solvent inlet into the column is disposed at the bottom of the column and the solvent outlet is disposed at the top of the column such that the solvent can flow through the column from the bottom of the column to the top of the column.

In some examples, the plurality of columns is configured horizontally, at some angle between horizontal and vertical, or both. Each column of the plurality of columns can include a water jacket disposed about the column to provide temperature control of the extraction process.

In some examples, the inlet, the outlet, or both, of each column comprises a set of valves. The set of valves can include a first valve and a second valve, wherein the first valve is disposed inwards towards the central portion of the column and the second valve is disposed outside of the first valve such that the second valve is further away from the central portion than the first valve. The first valve can include a screen such that when the first valve is closed the solvent can still flow through the first valve, and when the first valve is opened the extractable material in the column can also pass through the first valve. The first valve and the second valve can both be configured in the open position to discharge the extractable material from the column. The first valve and the second valve can both be configured in the open position to fill the column with a predetermined amount of the extractable material.

In some examples, the piping system can be configured to isolate a column of the plurality of columns after the column has been used in an extraction process so that the column can be cleaned in place while other columns of the plurality of columns can still be used in the extraction process.

In some examples, the piping system can be configured to exhaust the solvent from one column of the plurality of columns after an extraction process is completed in the one column, and input the solvent from the one column into a second column of the plurality of columns so that the recovered solvent from the first column is not lost or wasted.

In some examples, a first set of the plurality of columns are configured vertically such that, for each column from the first set of columns, the solvent inlet into the column is disposed at the top of the column and the solvent outlet is disposed at the bottom of the column such that the solvent can flow through the column from the top of the column to the bottom of the column, and a second set of the plurality of columns, different than the first set, are configured vertically such that, for each column from the second set of columns, the solvent inlet into the column is disposed at the bottom of the column and the solvent outlet is disposed at the top of the column such that the solvent can flow through the column from the bottom of the column to the top of the column.

The disclosed subject matter includes an extraction method. The extraction method includes providing an extraction apparatus that includes a plurality of columns, wherein each column of the plurality of columns includes an inlet into the column configured to provide an extractable material into the column, a central portion configured to hold the extractable material during an extraction process, and an outlet out of the column configured to expend exhausted extraction material. The extraction apparatus includes a piping system connected to each of the plurality of columns, wherein the piping system is configured to provide for selectively connecting each of the plurality of columns, such that each column from the plurality of columns can be configured for an extraction process either singularly or in series or in parallel with one or more other columns from the plurality of columns, administering a solvent to one or more of the plurality of columns, and outputting the solvent after an extraction process occurs in the one or more of the plurality of columns. The extraction method includes configuring the extraction apparatus for a first extraction column length by selecting a first set of columns from the plurality of columns for use in the extraction apparatus.

In some examples, the plurality of columns are configured vertically, and the extraction method further includes providing, for each column from the plurality of columns, a solvent at the solvent inlet disposed at the top of the column so that the solvent can flow downwards through the column and out the solvent outlet disposed at the bottom of the column.

In some examples, the plurality of columns are configured vertically, and the extraction method further includes providing, for each column from the plurality of columns, a solvent at the solvent inlet disposed at the bottom of the column so that the solvent can flow upwards through the column and out the solvent outlet disposed at the top of the column.

In some examples, the inlet, the outlet, or both, of each column comprises a set of valves, wherein the set of valves comprises a first valve and a second valve, wherein the first valve is disposed inwards towards the central portion of the column and the second valve is disposed outside of the first valve such that the second valve is further away from the central portion than the first valve, and the extraction method further includes configuring both the first valve and the second valve in the open position to discharge extractable material from the column.

In some examples, the inlet, the outlet, or both, of each column comprises a set of valves, wherein the set of valves comprises a first valve and a second valve, wherein the first valve is disposed inwards towards the central portion of the column and the second valve is disposed outside of the first valve such that the second valve is further away from the central portion than the first valve, and the extraction method further includes configuring both the first valve and the second valve in the open position to fill the column with a predetermined amount of extractable material.

In some examples, the piping system is configured to isolate a column of the plurality of columns after the column has been used in an extraction process, and the column is cleaned in place while other columns of the plurality of columns are still being used in the extraction process.

In some examples, the piping system is configured to exhaust the solvent from one column of the plurality of columns after an extraction process is completed in the one column, and the piping system is configured to input the solvent from the one column into a second column of the plurality of columns so that the recovered solvent from the first column is not lost or wasted.

The apparatus includes a counter-flow, multi-column extractor that includes a variable extraction column length (e.g., that is selectable by the operator). The extractor can be operated on a semi-continuous basis. The techniques therefore provide for an extraction system of configurable length that can be used to make a wide range of solids in solution.

The columns can be configured in different alignments and configured for different types of flow-through. In some embodiments, the columns are vertical columns with flow through the columns from bottom to top. In some embodiments the flow through the columns can be configured to be vertical from top to bottom, such as being assisted by gravity. In some embodiments, the columns could be horizontal and/or at any other angle, including compound angles (e.g., to accommodate space).

The columns can be configured to operate in different arrangements. Each column may be used singularly, in series with other columns, and/or in parallel banks. In some embodiments, any column can be configured to be bypassed (e.g., for any reason, such as a plugged column or for cleaning).

In some embodiments, the columns are externally water-jacketed for temperature control of the extraction process. In some embodiments the overall system operation is controlled by numerous valves and piping which, in turn, may be controlled either by hand or using any of various automation techniques, as is well known in the realm of industrial controls.

In some embodiments the columns can be configured to be "over square" dimensionally, e.g., ranging from a ratio of 1 unit of diameter to 2 units of height (1:2) to a ratio of 1:20 or more.

In some embodiments the extraction parameters established for each column (e.g., temperature, pressure, flow rate, etc.) can be individually controlled to optimize the overall system operation. In some embodiments the extraction parameters for all columns are made the same while in other embodiments one or more of the columns are set to operate at conditions different from the rest.

The techniques can be configured to operate at different pressures. In some embodiments the operating pressure is below atmospheric pressure. In some embodiments, the operating pressure could be 250 PSI or more. Similarly, operating temperatures for various embodiments could vary from just above freezing up to 212° F.

In some embodiments, a solid substance (e.g., coffee grounds) or other material that can be extracted, herein also referred to as an extractable material, can partially or totally fill one or more of the columns. If the extractable material is coffee, for example, that coffee can be whole bean or ground, roasted or green, blends, single origin and/or the like. In operation, a solvent, e.g., water, flows by, around, into and thru these solids, to extract or wash out or separate the preferred solutes of aromas and flavors from the solid substrate, as desired.

In some embodiments, screens or filters are installed in the system periodically to prevent mass flow of unwanted solids and to maintain separation of extract from the extractable materials. In some embodiments these screens or filters can be by-passed without disassembling the column or the system.

Additionally, in some embodiments, full-port valves (e.g., ball valves) can be incorporated into the columns to allow efficient loading or reloading of the columns. The valves can also be configured for use with discharge of exhausted/spent extractable materials. In some embodiments the port diameter of the valves can be the same or larger than the inside diameter of the body of the extraction column. This can allow for ease of loading and discharge.

In some embodiments the system includes a clean-in-place (CIP) system to aid cleaning, extraction of spent extractable materials, and sterilization of the system.

In some embodiments the system includes a modified atmospheric gas (MAP) system for minimization of oxidation of sensitive aroma and flavor compounds prior to or during extraction, for assistance in dewatering the spent extractable materials, and for help, if needed in discharging the spent extractable materials from the columns.

In some embodiments the system includes augers or conveyors or feed mechanisms to deliver fresh extractable materials to the columns and carry away spent extractable materials once a column is emptied. In some embodiments these operations are controlled manually by the operator. In other embodiments these operations are automated.

Such techniques can allow the system to create, for example, liquid coffee extract that ranges in BRIX from less than 1 up to and including 60 (or an equivalent level as measured using a TDS scale). In some embodiments, and depending on the extraction parameters used, the resulting extracts would be considered to be of "normal" taste and aroma and would be free of solids of hydrolysis. In some embodiments, these extracts could be used in a carbonated beverage without degassing of the $CO_2$ used for carbonation.

Advantageously, the reconfigurable multiple column techniques described herein can perform better than a system with a single column of identical length or volume, which can suffer from both excessive pressure loss due to length, and a much higher probability of plugged flow conditions compromising the operation of the entire one-column system, which can result in revenue loss and time loss.

Accordingly, there has thus been outlined, in broad terms, features of the disclosed subject matter in order that the detailed description thereof that follows may be better understood, and in order that the present contribution to the art made by the apparatus and techniques disclosed herein may be better appreciated. There are, of course, additional features of the disclosed apparatus and techniques that will be described hereinafter. It is to be understood that the phraseology and terminology employed herein are for the purpose of description and should not be regarded as limiting.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

DETAILED DESCRIPTION

Figure 1:
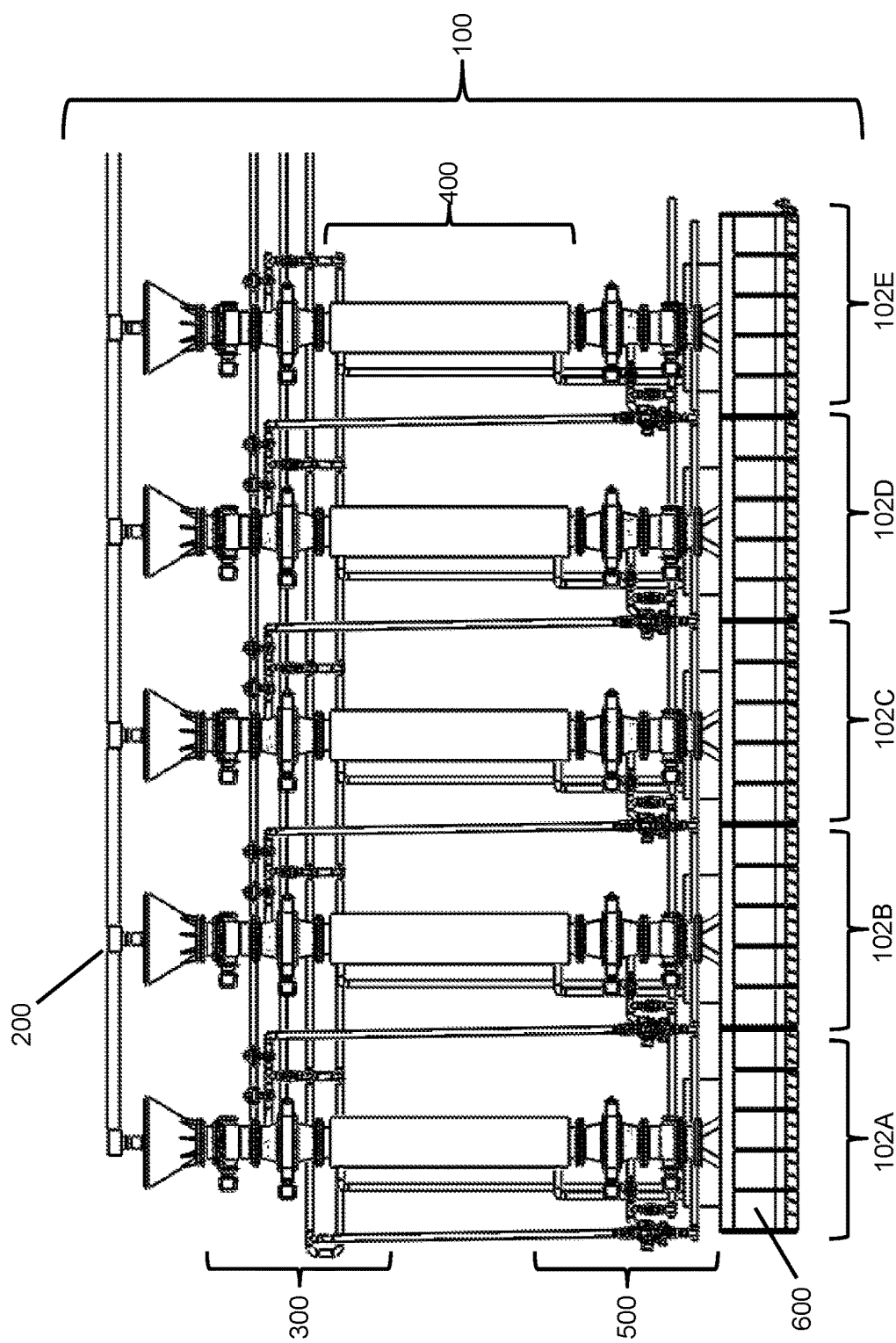
FIG. 1 is a frontal view of an extraction system incorporating five vertical columns, according to some embodiments.

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are exemplary, and that it is contemplated that there are other systems and methods that are within the scope of the disclosed subject matter.

The methods and apparatus described herein are intended to allow for a high-quality, repeatable, industrial-scale extraction of desirable compounds from extractable materials, such as coffee grounds. The extraction can be performed using a semi-continuous process with laboratory-level control of various operational parameters. The system can also provide the ability to quickly take a blocked or otherwise poorly performing column (e.g., a column evidencing reduced flow rate, or a column that has developed flow which is localized flow through a small part of the column cross-section, perhaps because that section has developed a low-resistance pathway which allows the flowing liquid to bypass the rest of the extractable materials in that section of the column, a condition sometimes described as channel flow) off-line so that the problem can be resolved while the rest of the system continues to operate normally (e.g., by still operating using the remaining columns configured in the system). The condition of flow within the columns can be configured such that it desirably can be characterized by an essentially uniform flow profile of the moving liquid across the entire cross-section of a column and along its entire length. Such a uniform flow can result in predictable increases in TDS at the end of each column as well as predictable pressure drops and flow rates. Sensors for measuring operating parameters of the flow, e.g., TDS, pressure, flow rate and/or temperature, can be used in some embodiments to monitor these parameters and to provide inputs for manual or automated controls for various valves, heaters, pumps and/or the like to help achieve the desired conditions. These sensor inputs, such as TDS, can be used in evaluating when a flow condition or level of extraction exists that requires taking one or more of the columns off-line and either recharging it with new extractable materials or performing some other corrective action that will re-establish the desired conditions.

For illustrative purposes only, the vessels or containers used to hold the extractable materials may be referred to herein as columns. It is to be understood that the term "column" does not necessarily imply any specific shape, since while a column may be a tubular structure with a length greater than its diameter, the column may have other shapes such as a rectangular shape, etc. Also for illustrative purposes only, some examples show the columns being arranged vertically. It is to be understood that other alignment configurations are possible without departing from the spirit of the techniques described herein. Also, for purposes of illustration, the terms BRIX and TDS are uses somewhat interchangeably herein. It is recognized that they different parameters and one may be more appropriate than the other in a particular context, but one knowledgeable in the art will recognize that these or other techniques can be used to describe a level of solute loading, for example, to describe the strength of a coffee extract.

FIG. 1 shows a system 100 consisting of five vertical columns 102A-102E (collectively referred to as columns 102), according to some embodiments. The overall system 100 can be broken down into several major subsystems for easier description in subsequent figures.

Subsystem 200 includes the components which deliver fresh extractable materials, e.g., coffee grounds, to the individual columns. Subsystem 200 is described in further detail in conjunction with FIGS. 3-6.

Subsystem 300 includes the upper portions of each column, exclusive of the feed system 200. Subsystem 300 includes, for example: (1) a full-port valve (e.g., a ball valve) at the very top to allow loading of the column with the extractable material and then sealing of the column against any fluid losses; (2) a full-port valve that can be modified to include a screen or filter that will, when closed, permit flow through the valve of the solvent and its dissolved solids, but will prevent flow of the extractable materials and will, when open, permit flow of the extractable materials for, e.g., loading; and/or (3) transition sections, motorized controls, miscellaneous flow valves, etc. Subsystem 300 is described in further detail in conjunction with FIGS. 3-6.

Subsystem 400 occupies the central portion of the column. Subsystem 400 can include, for example: (1) the container to hold the extractable materials during the extraction process (e.g., a flanged pipe); (2) a water jacket (e.g., disposed around the container) which helps to control the internal temperature of the column and its contents; and/or (3) various piping, sensors, etc. configured, for example, to measure the temperature of the fluid inside the columns, the pressure of the fluid as it enters and leaves a column, the TDS of the fluid after each column, the flow rate of the fluid, and/or the like. Temperature can be measured to ensure the fluid is maintained at an optimum temperature for desirable extraction of certain dissolvable solids without causing the extraction of less desirable dissolvable solids or breakdown of some compounds, e.g., cellulose. Pressure can be measured, for example, to help detect plugged flow or channel flow, both of which can lead to inefficiencies in the extraction process and loss of revenue, and to help ensure that system design pressures are not exceeded. Measurement of TDS can be used, for example, as a means to ensure that the extractable materials are not over or under extracted and to determine when the fluid/solute can be allowed to exit the system and move to final filtration, chilling and packaging. Flow measurements can be used, for example, in helping to diagnose certain conditions like plugged flow or pending problems with the system. In some embodiments, each column has numerous auxiliary pipes, valves and pet cocks as well as other sensors to enhance control and automation.

Subsystem 500, which occupies the lower portion of each column, can be, for example, similar to subsystem 300 at the upper end of the column. In some embodiments, subsystem 500 also includes a booster pump to maintain the working pressure of the solvent and incorporated solids as they flow through the columns, as shown in further detail in FIG. 7.

Subsystem 600 includes the trough and auger system used to remove spent solids that have been dumped from one of the columns to a point of collection and further treatment.

The five vertical columns 102 illustrated in FIG. 1 are meant to be illustrative only, and other embodiments can include systems with 1, 2, 3, 10, 20 and/or any other number of columns without departing from the spirit of the techniques described herein. For example, in some embodiments of system 100, each of the vertical extraction columns would be staged side-by-side in a row comprising up to 10 columns. Each column can have a cylindrical central column 401 (internal cavity) used to contain the extractable materials, that cavity having a diameter in some embodiments of 12 to 18 inches and a length of 10 to 15 feet. In some embodiments, each column and/or any other component in direct contact with the solvent, solute or extractable materials is built using 316 or 310 alloy stainless steel and manufactured to ASME pressure standards and has an NSF electropolished surface internally. In some embodiments, other diameters, lengths, alloys, surface finishing techniques, and/or the like could be used. In some embodiments, each chamber can be configured to hold 500 to 1000 lbs of grinds, so brewing occurs quickly per chamber and hydrolysis is managed to be low to zero per chamber.

To avoid over-complicating FIG. 1, various other pieces of hardware that can be used with the extraction system are not shown. For example, additional hardware that is not shown can be used to complete the extraction process, to capture, preserve and/or package the extract for sale, and or the like. For example, the apparatus can include pumps configured to supply filtered, temperature controlled solvent (e.g., water) at the required pressure and volume using pumps of the required capacity (e.g., using variable frequency drive—VFD—controlled pumps) as well as supplying the CIP fluids. These pumps could be located, for example, at one end of the line of columns and connected to the columns using piping 805 and 802 illustrated in FIGS. 3-8. As another example, the apparatus can include pumps to assist in removal of the drainage/waste liquids. Like the supply pumps, these pumps can be located, for example, at one end of the line of columns and connected using other piping 807 as illustrated in FIGS. 3-8.

As another example, the apparatus can include a heat exchange system typically used to quickly cool the extract prior to packaging. Such heat exchange systems can be used to enhance product preservation. The heat exchange system can be configured, for example, to take the output of the extraction columns, an extract containing a fluid with the desired level of dissolved solids, and using a portion of piping 800 shown in FIGS. 3-8 heat exchanger can be used to change the temperature of this liquid from a temperature that to transport the extract from the last column used to the heat exchanger. The was desirable for the extraction process to a temperature that is desirable for the packaging process and to minimize oxidation of any flavor or aroma compounds carried in the fluid as dissolved solids or gases. This heat exchanger, in some embodiments, would be to the side of the columns outside the view shown in FIG. 1. The heat exchanger at the discharge end can be configured, for example, to bring the extract to 28 degrees Fahrenheit before packaging (e.g., in a MAP controlled packager).

As another example, the system can include a MAP gas system supply. The MAP gas supply, in some embodiments configured as a series of high pressure tanks or a cryogenic nitrogen storage system, can be designed to supply a non-oxidizing gas such as nitrogen or argon to the various parts of the system. It would, in some examples, be located to the side of the columns or outside the factory building for safety reasons, and be connected to the columns using piping 801 as illustrated in FIGS. 3-8.

As another example, the system can include a series of filters designed to remove any particle above a certain size from the fluid containing the dissolve solids. For example, the filters could be specified to remove particles of 3-4 microns and larger, a specification that would ensure that any particles that did pass would be too small to be detected by most people as an aspect of taste or mouth feel. As another example, the filters may be specified to remove cholesterol containing or promoting compounds from the fluid that are known, for example, to be part of some unfiltered coffee products. In some embodiments these filters are by-passable as needed when flow rates drop below a certain threshold to ensure that the filter system does not become an unintended impediment to production.

As another example, the system can include equipment used to prepare the extractable materials for this process. For example, in the case of coffee, the system can include roaster(s) for coffee beans, grinders to grind the coffee beans, and/or storage components for the whole bean coffee and/or ground coffee. As another example, the system can include a control system, including sensors that would be typical of automated process controls today, as are known in the art and as were described above. As another example, the system can include electrical wiring to power motors or pumps. Additionally, the system does not illustrate some structural elements that may be needed to support and secure the columns or motors or piping, depending on the implementation. As another example, the system may include cleaning balls for CIP operations, nozzles for MAP gas delivery, and/or the like. Therefore it should be understood that the system can operate within a variety of different overall production processes that can be optimized for the particular extractable material being processed and the final form of the product to be delivered to the marketplace.

Referring to FIG. 1, for the illustrative example that follows, assume that all of the columns 102 in the system 100 have been loaded with an appropriate extractable material (e.g., coffee grounds) and the system is ready to operate.

Figure 4:
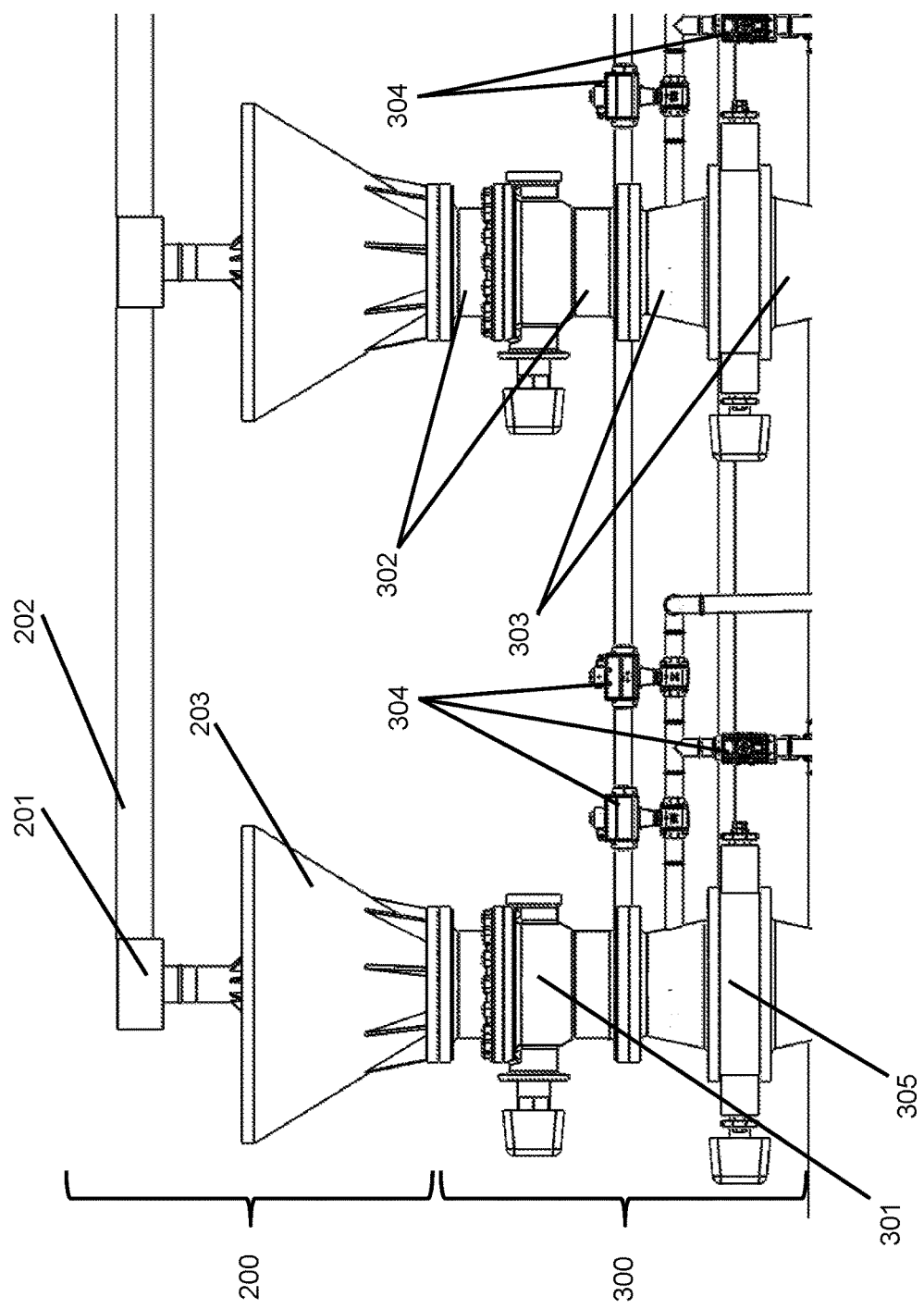
FIG. 4 is a frontal view of the upper portion of two columns of the extraction system of FIG. 1, according to some embodiments.

Column #1 in the extraction sequence (a column that could be physically located wherever the control operator has chosen to begin the process, such as column 102A or column 102C) has a solvent inlet at its bottom, e.g., between two full-port valves as shown in FIG. 4, but disposed on the bottom of the column), that allows the solvent (e.g., the strongest solvent, such as water with no extracted solids yet) into the bottom of that first column #1.

The solvent then passes through all of the columns configured for operation (e.g., all columns 102, or a subset of the columns 102). The last column in any configuration of columns typically outputs the richest solute solution, the result of the original solvent picking up more and more extracted solids from each of the columns it has passed through. As the solvent picks up more and more solids, its ability to extract additional solids can be somewhat reduced. For example, the first column can become depleted, e.g., give up all of the desirable extractable materials (full extraction) sooner, than subsequent columns, which may take more time to become depleted.

At a time that the first column #1 is spent or depleted (e.g., as determined automatically or manually by an operator, typically using a TDS sensor to evaluate the level of extraction and make a control decision), the flow of solvent to column #1 can be discontinued, such as by isolating the column #1 using external valves. The fresh solvent flow is then directed away from column #1 to the second column in the configuration, and extraction activity continues with the remaining columns.

Once the solvent is directed from column #1, column #1 is then considered "off-line" because it is no longer being used in the process. Therefore, the process of emptying, cleaning and/or reloading column #1 may begin.

At any given time during operation, many of the columns in the system are in an extraction flow condition (e.g., if all five columns 102 are configured for use, and the solvent begins in column 102A, then all five columns 102 are in an extraction-flow condition). Alternatively, one or perhaps more may be in the empty, clean, or reload modes of operation, as described above (e.g., when column #1 is off-line).

Thus, at start up, (assuming for example 5 columns), columns #1 thru #5 are loaded and flowing in series. When column #1 is eventually exhausted and taken off-line, columns #2 thru #5 can still be flowing, while column #1 is refreshed. Then when column #2 subsequently becomes exhausted, and columns #3 thru #5 are in extracting mode, column #1 may be re-established to its full and ready-for-extraction condition as the freshest column in line.

It can be seen here, that as any column in the bank is considered spent, it can be taken off-line for renewal, allowing all desired extraction columns beyond or down stream of that column to remain in full operation. As each and any column is spent or becomes plugged or develops channel flow, and/or the like, it can be bypassed and renewed, allowing for the remaining columns, regardless of position in the series, to be operational.

Extra columns may be designed into the system such that the desired TDS level can be achieved without using all of the columns. For example, again assuming 5 columns, assume that the desired TDS level can be achieved using only three of the five columns available. Hence, at the beginning, the flow would be diverted to the final processing stations (e.g., filtration, cooling, packaging, etc.) after emerging from column #3, omitting any travel through columns #4 or #5. Then, when column #1 is depleted and taken off-line, column #4 can be brought into the flow without any loss of potential for creating the desired TDS output. When column #1 comes back on line, it can be held in reserve until columns #2 and #3 have been depleted, so then columns #1, #4 and #5 could continue to produce the required product.

It will be seen that, for example 5 individual columns of for example 10' (feet) in length for each, can be operated as if it were one continuous column that is 50' (feet) long. One advantage of 5 individual columns is that this design allows for renewal of any spent areas of solids or plugged or channeled flow areas of solids at any time. Each 10' section can be monitored, e.g., for flow, pressure, temperature and TDS levels, separately to determine any areas of low flow or low yield or other local conditions that might lead to less-than-optimum product output and efficiency. Another advantage, as noted above, is that the entire extraction process does not have to be halted when a problem is identified that requires corrective action for one column. Instead, that column can be addressed while production continues.

If a column of some substantially longer length is desired, e.g., to achieve a higher TDS/BRIX, the needed column lengths can be added to the system at will by simply reloading a spent column and placing it back in the series for operation (e.g., using four columns instead of three in the example above) or bringing columns that were previously "in reserve" into the production flow. For example, to achieve an extract with a solids load that measures 10 BRIX, a 2 chamber or 3 chamber system can be used. If the overall system is larger than 2 or 3 chambers, parallel lines may be operated to increase overall system output if needed. For example, if the overall system is a 9 or 12 chamber system, the system can be run 3-6 parallel lines, each with 2 or 3 chambers in these parallel systems.

As an example, FIG. 1 includes a bank of five (5) columns 102A-102E. Assume that initially the system flow begins on the left with column 102A and exits to its final collection point on the right from column 102E. As first column 102A, and later columns 102B, 102C, etc. are extracted to a level of desirable solids in solution, each column can be taken out of the series, cleaned and replenished (renewed). When column 102A is taken out of service, column 102B becomes the first active column receiving the solvent. The first column, now 102B, in the series typically receives the strongest solvent compared to the solvent that the remaining columns 102C-102E receive from column 102B. "Strongest" in this context, means that it has the greatest potential for extracting desirable compounds from the extractable materials, generally because it contains no extractable materials at the point of first use. At some later point in time, column 102A may have been replenished and column 102B taken off-line. At this time, column 102C becomes the first column in the active columns 102C-102E and column 102A can be added back into the series such that it becomes the last column in the series (e.g., with the solute from column 102E routed back to column 102A again prior to exiting to final collection).

In some embodiments, the column with the solids that have been most heavily extracted is bathed using a solvent with the greatest potential to accept or dissolve or wash out additional extractable compounds, e.g., fresh pure water. Thereafter, each subsequent column in turn is slightly fresher than the previous column in the series (e.g., because it was refreshed more recently than the spent column and consequently has more remaining dissolvable solids available for extraction than the previous column), becomes the next column that the solvent (now with some quantity of dissolved solids being carried by the solvent) enters. In this way, the series of column acts similar to any counterflow system wherein an effort is made to always maintain approximately the same potential difference (e.g., concentration, temperature, etc.) between one substance and another.

As the extraction process proceeds, progressively weaker solvent (e.g., a solvent that contains more extracted compounds/solute) passes thru column after column, making richer solute or extracts, until, e.g., the specification of TDS is reached or the extract has reached a point where it is no longer capable as acting like an effective solvent.

With this general understanding of the semi-continuous extraction process described herein, the specific elements of system 100 will be more easily understood in terms of their function and their relationship to the overall system operation.

Figure 2:
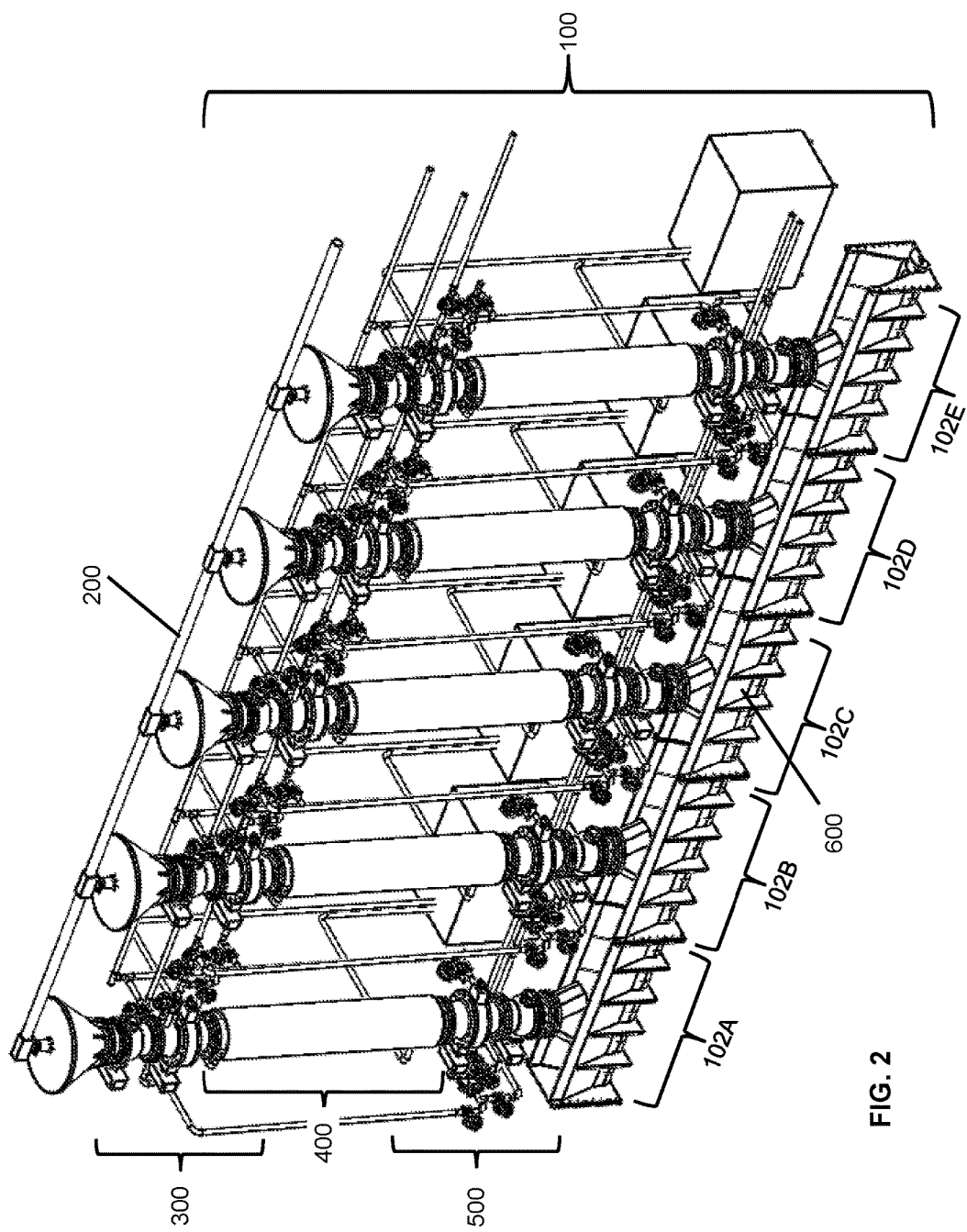
FIG. 2 is a perspective view of the five-column system of FIG. 1, according to some embodiments.

Referring to FIG. 2, the same major subsystems are labelled for the five column system shown in FIG. 1, according to some embodiments. FIG. 1 shows the system 100 consisting of the five vertical columns 102A-102E (collectively referred to as columns 102). Subsystem 200 includes the components which deliver fresh extractable materials, and is described in further detail in conjunction with FIGS. 3-6. Subsystem 300 includes the upper portions of each column, exclusive of the feed system 200, and is described in further detail in conjunction with FIGS. 3-6. Subsystem 400 occupies the central portion of the column. Subsystem 500, which occupies the lower portion of each column, can be, for example, similar to subsystem 300 at the upper end of the column and may also include a booster pump. Subsystem 600 includes the trough and auger system used to remove spent solids that have been dumped from one of the columns to a point of collection and further treatment.

Figure 3:
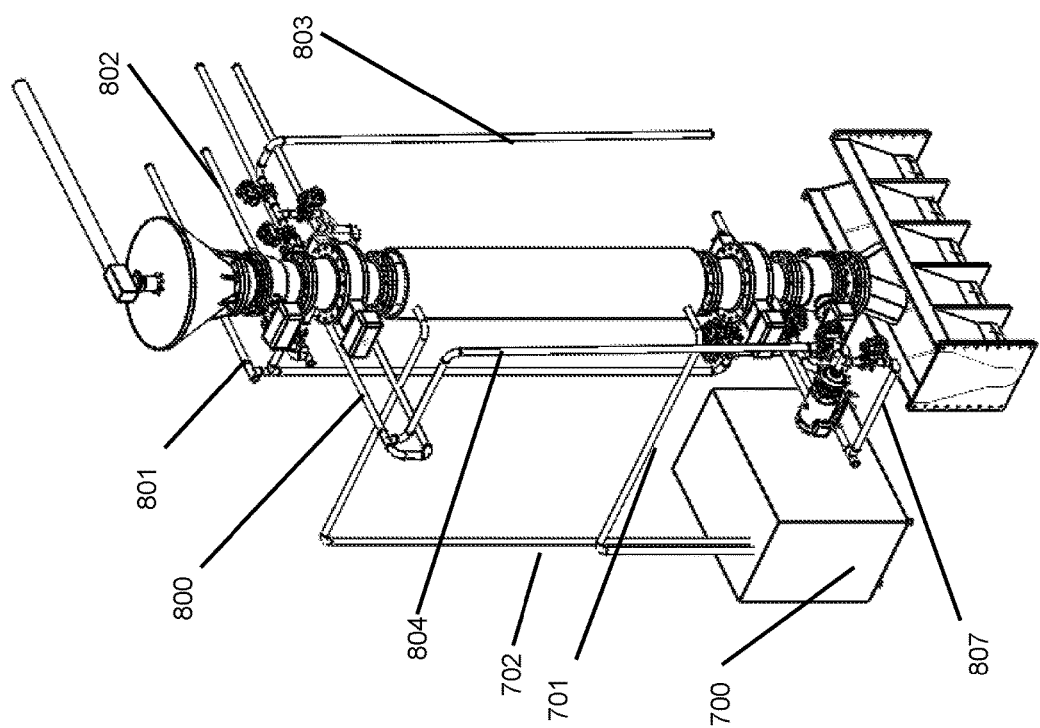
FIG. 3 is a perspective view of the left-most column of a multi-column extraction system, according to some embodiments.
Figure 5:
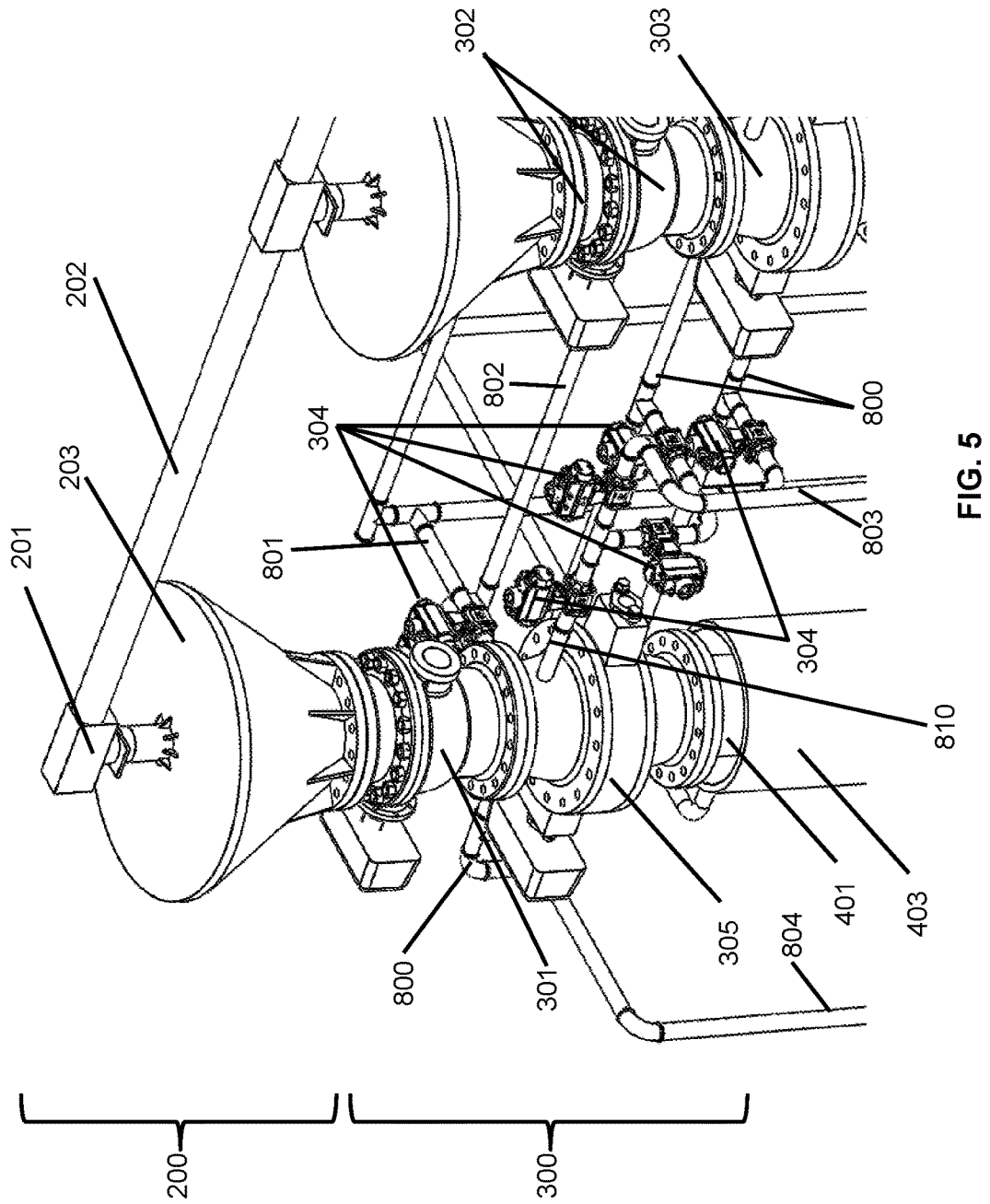
FIG. 5 is a perspective view of the upper portion of the two columns shown in FIG. 4, according to some embodiments.

Referring to FIG. 3, the left-most column of system 100 shown in FIGS. 1 and 2 is shown, according to some embodiments. FIG. 3 illustrates various portions of an exemplary piping system with connections between different columns and the supporting pumps, fluid reservoirs, treatment centers, and/or the like that are part of systems outside the extraction columns of system 100. In FIG. 3, piping loop 800 is used to recirculate solute so that the overall flow of the extracted liquid from partially extracted solids to fully loaded solute can be controlled with respect to which column next receives the output from the first column served, and so on until the fully loaded solute is removed (e.g., to the downstream process portion of the manufacturing process). As described herein, this loop can be configured to allow the column 102A to be the last column in an extraction sequence, with solvent first flowing to column 102B and arriving at column 102A from column 102E in one example. This loop 800 connects to each column at two points as shown in FIG. 5, between output pipe 810 which exits from the transition section 302 just below full-port valve 301 and down-flow pipe 803 which leads to the next column in the line. The one exception is the left-most column, where piping loop 800 also connects to down-flow pipe 804. As a result of this piping and valve manifold, it is possible for every column to become the "last" column of the extraction process in a continuous way.

Again referring to FIG. 3, piping 801 in this exemplary illustration is part of the system delivering, e.g., MAP gases to the column, which can minimize oxidation of coffee grounds after they are loaded into the column and before solvent begins to flow through the grounds. This system serves two additional functions. The first is to help push out excess liquid extract remaining in the interstices of the extractable materials prior to emptying the column. This occurs before the screened valves are opened. This step acts to "squeeze" extracts from nearly spent solids, and dry those spent solids prior to discharge. The second function is to help expel the spent solids after the screened valve is opened. Both methods de-wet the spent solids for more acceptable discharge and reuse without auxiliary de-watering. The "water of wetting" may be discharged from the top or bottom as a solvent or as waste water respectively. Piping 801 connects to each column at the rear of transition sections 302 and 502, just inboard (toward the center of the column) from their respective outer full-port valves 301 and 501 in FIGS. 3, 5 and 7.

In some embodiments, MAP gas can also be used at the bottom of any column location to assist in breaking up (e.g., burping or disturbing), for example, plugged flow or dry spotting, or channeling, as well as the evacuation of extracts without further dilution. For example, evacuating or pushing the extract solution from any specific column using a MAP gas can be used instead of adding more pressurized solvent, e.g., because the addition of MAP gas does not add additional diluent (thus lowering BRIX) and simultaneously dries out the spent column, allowing for dryer discharge. A BRIX/TDS meter and a flow meter, together on each column, can inform the system or operator when to cease using solvent and to revert to a MAP gas to push out/squeeze out residual liquids. Since the system can be configured to monitor the volume of grinds in any column, and the quality of solvent entering, the system can predict the BRIX gain anticipated, and be in control of each columns addition.

The MAP gas piping can be used to vent the extract into the next chamber without dilution, and can be implemented well in advance of BRIX decline. The resulting dry grinds are easily expelled out the bottom full port valves without restriction. Therefore, in some embodiments there is no need to perform dewatering, and in turn less waste water and no dewatering press are required.

If, for example, a factory wants to make 30 BRIX product, 3 columns×10' long used in series may be the right solution, whereas if the same factory wanted to make a 10 BRIX product, all other things being the same, those 3 columns could be operated in parallel. The length×diameter of each column can be configured to dictate the volume of extractable materials contained, and the quality and quantity of those extractable materials dictates the BRIX available without overshooting or under shooting the BRIX goal. Thus adding additional water at the end of the extraction process or implementing concentration steps can be avoided properly sizing the columns and by using the MAP gas push-out process. For example, green coffee from different origins yield different quantities of extractable materials. As another example, hard bean coffee compared to soft bean coffee (e.g., which may be altitude dependent) can yield different quantities of extractable materials. As another example, dark roasts may yield less extractable materials than light roasts by measure, but not by taste, as dark roast coffee looks and tastes stronger. Numerous columns that can be operated at will and in control as described herein, such as in series or in parallel, can provide more control over results.

Piping 802 can be part of a CIP fluids delivery system. Piping 802 connects to each column at the top of the column in the transition section 302 to the side of the piping inlet for pipe 801 in FIGS. 3 and 5. This CIP system includes a spray ball (not shown) which is placed at the top of each column (below the ball valve 301 and above the screen valve 305) with its own control valve to allow CIP of an empty column prior to refilling. Supplementary spray balls may be required in other locations to address cleaning around the various large valves and other places where a build-up of extractable materials or bacterial growth might otherwise occur.

Figure 7:
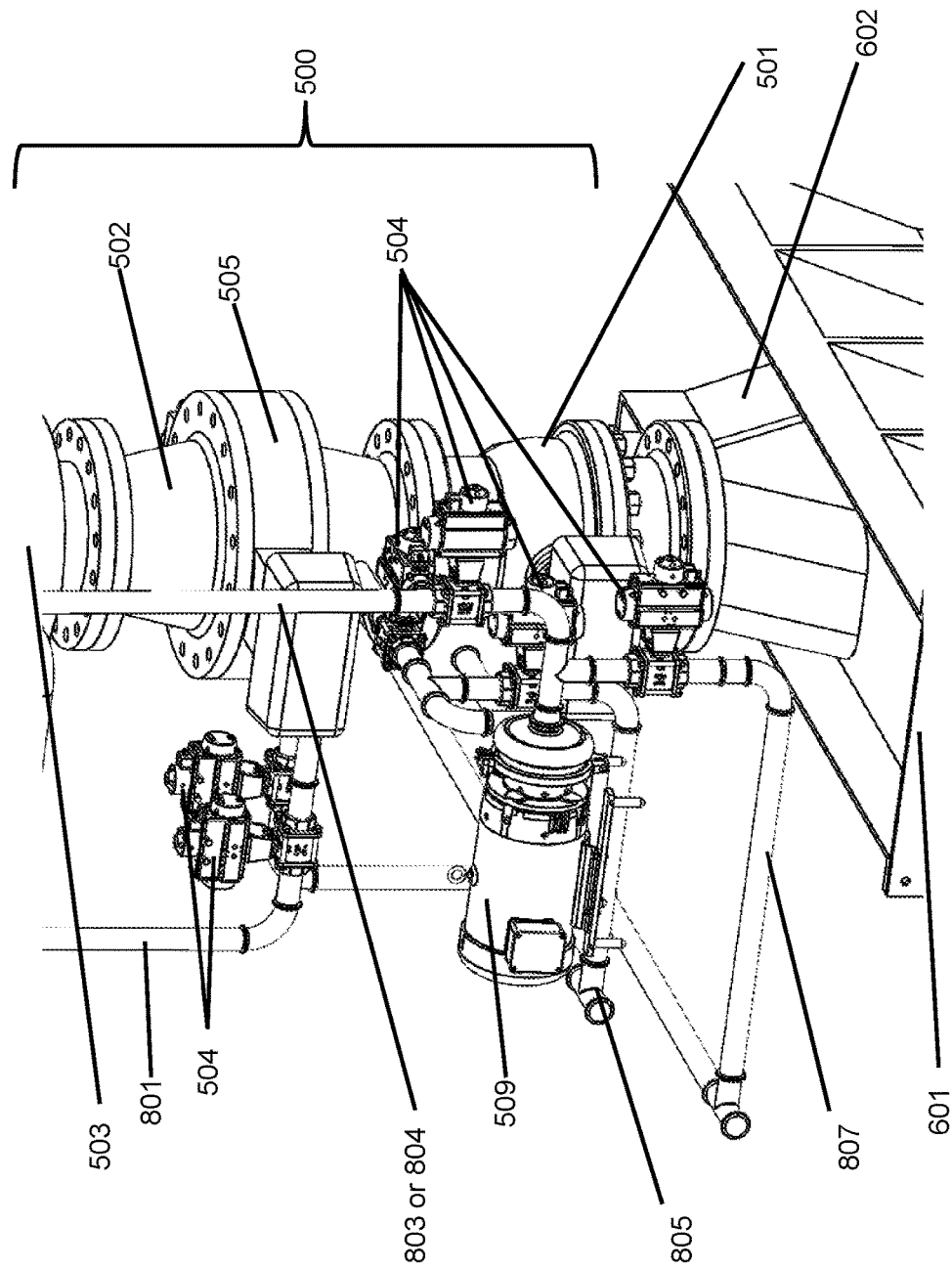
FIG. 7 is a perspective view of the lower section of the single column shown in FIG. 3, according to some embodiments.

Piping 803 and 810 are two sections of a pipe that connects the output of solvent and solute from one column to the input to pump 509 of the next column in the extraction sequence. Piping 804 is similar to piping 803, but delivers the solvent to the column shown from the recycle loop 800 to the left-most column only. Piping 810 connects to each column on the right side of transition 302, just below valve 301, transitions to pipe 803 after the miscellaneous valves 304 used to interface the extraction piping with loop 800, and pipe 803 then enters pump 509's inlet, whereafter the solute is directed into the bottom of the next column in the side of transition section 502 just above valve 501 as shown in FIGS. 5 and 7.

As described herein, in some embodiments there are auxiliary external pipes that allow the solvent fluid to enter and fluid with extracted solids to exit each extraction column. In some embodiments the external pipes just described enter and exit between the pair of valves that reside at the top and bottom of each extraction column's central container 401. In some embodiments these auxiliary pipes attach horizontally when the columns are upright, and the external pipe flow is from the top of one column downward to the bottom of the next column, using gravity to assist. In some embodiments, at the bottom of each of these lines, but before the piping enters the next column, there is a booster pump 509 to resupply needed pressure and control flow rate otherwise lost during travel through the prior extraction column. It should be noted that the flow as just described enhances pump inlet conditions.

In some embodiments, these pipes, the associated external control valves, and the contact surfaces of the pumps can be made using the same materials as the extraction columns. In some embodiments, the pipe diameter is nominally 2 inches and the control valves, e.g., 304 and 504, are sized to match.

In some embodiments, the pipe that exits the top of column 102A is connected to the bottom of column 102B, so as to conduct extraction fluid from one column to the next, in a continuous top to bottom format, resulting in ever-enriched solids in solution, pass after pass, and column after column. Each of these external pipes can include valves (e.g., set as close as possible to its inlet or outlet) so as to control flow, or isolate any or all columns as required. Each external pipe can include a pump that boosts solvent flow into the next column, so all columns in line have essentially the same conditions of pressure, temperature and flow as any other column in the series. Thus the conditions of extraction can be configured to be similar (if not identical) in each column, regardless of position in the flow sequence. For example, with increasing extraction and increasing solids in solution as the extract moves from column to column, the viscosity of the liquid extract may change slightly, causing some changes in local pressure drop, flow rates, and/or the like.

As described above, in some embodiments the external piping geometry allows the extract to flow vertically downward between columns and vertically upward within the columns. It is understood that while this may be preferable, it is not required. For instance, it would also be possible to have the extract flow upward through one column, horizontally to the top of the next column, vertically downward through that second column, horizontally to a third column, vertically upward through that column, etc.

Within FIG. 3, item 700 is a temperature controller meant to illustrate one potential apparatus for heating or cooling a liquid that could be used within a heat transfer jacket outside the central portion of the column (e.g., 400 in FIG. 1) to help maintain the internal working temperature of the column and its flowing solvent. Piping 701 and 702 are supply and recovery pipes for the heated or cooled fluids produced by temperature controller 700 so that they can be fed into the jacket on the column. In some embodiments, the extraction temperature inside the columns must be maintained between 193 and 203 degrees Fahrenheit. Each and every column may be controlled separately in terms of temperature and pressure, thus controlling contact time and preventing hydrolysis.

FIG. 4 illustrates the upper section of two columns, according to some embodiments. Subsystem 200 includes of a flexible auger system 202 for moving extractable materials from some central reservoir (not shown) to the vicinity of each column. Movement of solids into a hopper 203 is controlled by a valve 201. In some embodiments, sufficient extractable materials to completely fill the column can be stockpiled in the hopper immediately before the column is recharged. MAP gases can be infused into any solids which are resident in the auger system 202 or the hopper 203 to help minimize oxidation of sensitive flavor and aroma compounds in the coffee grounds as a way to help maintain peak quality during the brewing process. In some embodiments the feed auger 202 is a flex auger or drag chain type that is set up to recirculate granular extractable materials, back to the source hopper. Each outlet of the feed auger has a control valve 201 that fills a hopper 203 of known volume that is mounted directly to that columns top ball valve.

In some embodiments, when the operator has emptied a particular column and completed the CIP process, a command is given to open that column's hopper to allow solids flow into the central container 401 and accurately refill to just below the upper valve with the fine mesh screen 305.

In some embodiments, when a hopper of known volume is emptied into its respective column, that column's ball valve 301 and screened valve 305 are closed. The renewed column is now in an extractable, ready-to-use condition.

In some embodiments, the upper screw auger 202 can be solidly connected to each column's hopper 203, but preferably connected with a gap at the top (and level control) to prevent contamination or moisture transfer to the solids in the feed auger.

Again referring to FIG. 4, subsystem 300 includes a full-port valve 301 (e.g., a ball valve); a second full-port valve 305 (e.g., a butterfly valve with a modified plate incorporating a screen/filter, as described in further detail with reference to FIGS. 9-11); transition sections 302 and 303 between hopper 203, the valves 301 and 305, and the central container (e.g., flanged pipe section, not shown in FIG. 4). This subsystem can also include a variety of valves, shown here as automated valves, represented by item 304. Not shown, for clarity, are various sensors, power wires, and/or the like, e.g., used to monitor and control the automated valves that would be known to one of skill in the art. The flow control valves at the top of each chamber can control flow and pressure, so that, for example, oversize coffee grinds are pressure treated with brew solvent for total internal wetting. In some embodiments, these grinds can be rather large, such that the grinds are not compressible and have maximum interstitial space for good flow. Larger grinds can be used, for example, for pressure regulation at about 75 PSI.

Referring to FIG. 5, the subsystems 200 and 300 from FIG. 4 are shown in perspective view, according to some embodiments. As explained in conjunction with FIG. 3, subsystem 200 consists of a flexible auger system 202 for moving extractable materials from a central reservoir to the vicinity of each column. Movement of solids into a hopper 203 is controlled by a valve 201. Subsystem 300 consists of a first valve 301; a second valve 305; transition sections 302 and 303 between hopper 203, the valves 301 and 305, and the central container (e.g., flanged pipe section); and automated valves 304.

FIG. 5 also shows (1) the central container 401 (e.g., a piece of flanged pipe); and (2) the water jacket 403 used to maintain a desired temperature for central container 401.

Figure 6:
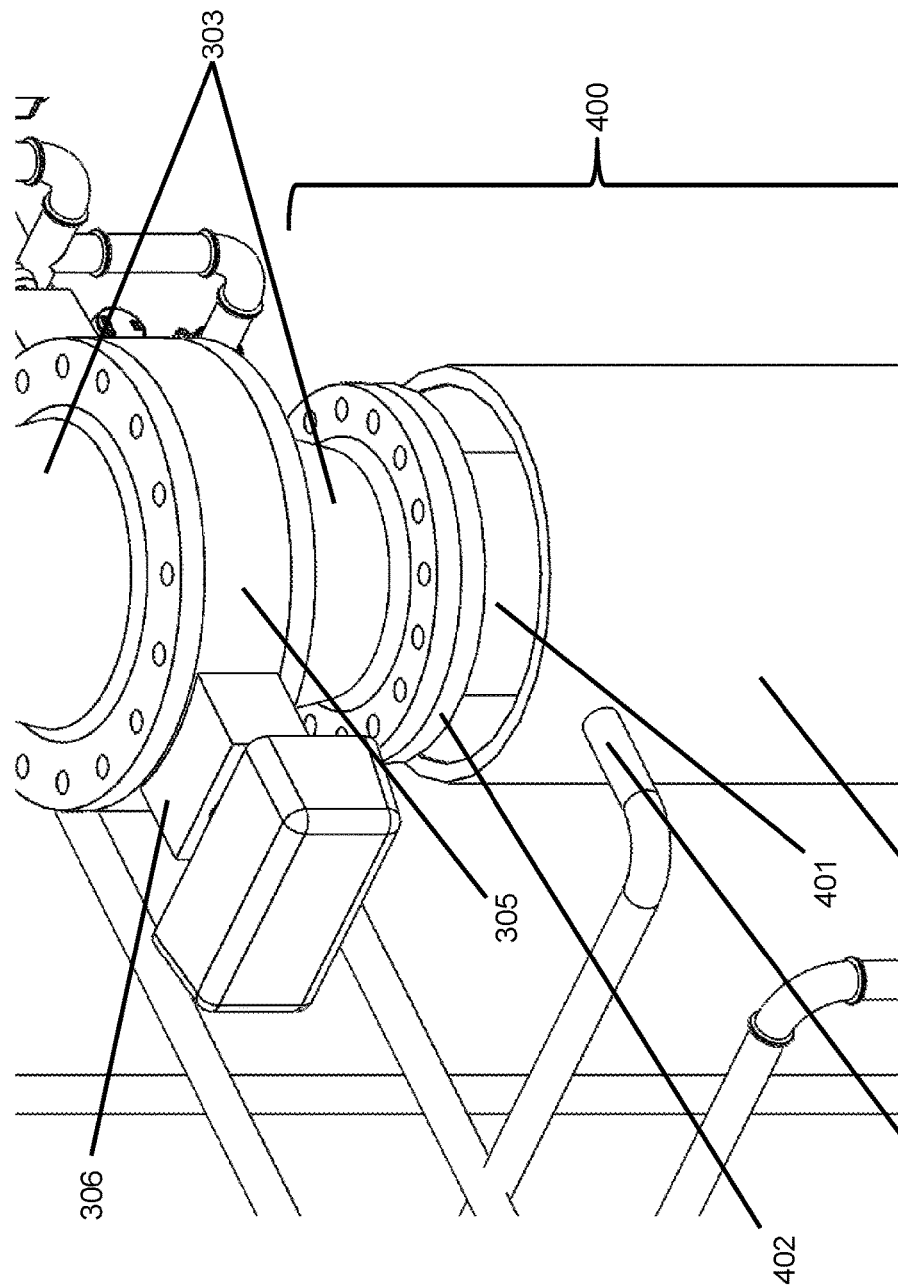
FIG. 6 is a perspective view of the upper-middle section of one column, according to some embodiments.

FIG. 6 illustrates the components of subsystem 400 from FIG. 1, in accordance with some embodiments. FIG. 6 shows the central container 401, the heat transfer jacket 403, a connection flange 402 which can link the central container 401 to the transition section 303 and full-port valve (e.g., butterfly valve) 305. Shown also are a motorized valve control 306 and piping 702 which connects the heat transfer jacket to the temperature controller (e.g., temperature controller 700 shown in FIG. 3). Within the space between the central container 401 of the extraction column and the outer jacket of the heat transfer jacket 403, the temperature controlled fluid enters from a heater or cooler, circulates around the extraction column in a controlled way, and exits back to the heater or cooler as desired by the operator.

FIG. 7 illustrates subsystem 500 at the lower end of the column, according to some embodiments. In some embodiments, valve 501 is similar to valve 301 at the top of the column, such as a full-port valve used to seal the column (e.g. a ball valve). Similarly, valve 505 can be similar to valve 305 at the top of the column, and can incorporate a screened plate to allow the flow of fluids through the valve when closed, but to also limit the flow of extractable materials when closed and permit the flow of solids when open, as described in further detail with reference to FIGS. 9-11. In this case, flow of solids would be for spent solids being discharged to the waste collection trough 601 through outlet funnel 602.

Also referring to FIG. 7, subsystem 500 also includes a booster pump 509 and various control valves illustrated by item 504. In this example, pipe 807 is part of the drain system and pipe 805 is part of the fresh solvent (e.g., water) system. In some embodiments, the water is heated to about 197 degrees Fahrenheit and filtered using reverse osmosis (RO) for purity. The water can also be de-gassed to remove as much of the free oxygen ($O_2$) as possible. This degassing can be achieved, for example, by holding the hot water near 212° F. and at atmospheric pressure under a MAP gas blanket and inside a SS tank. In some embodiments it may be desirable to add certain chemicals such as calcium or magnesium back into the RO filtered to enhance certain extraction processes.

Also referring to FIG. 7, transition pieces 502 and 503 can serve the same functions as transition pieces 302 and 303 at the top of the column, namely to (1) accommodate the differing flange sizes required of the two valves versus the e.g., flanged pipe section which comprises the central container, (2) serve as a necessary spacer so the butterfly valve's rotating plate in 305 or 505 can rotate freely, and (3) to provide needed space for the various small piping connections for the various support subsystem, e.g., fresh solvent delivery, MAP gas delivery, CIP fluid delivery, drainage, etc.

In some embodiments, the booster pumps 509 shown in FIG. 7 are centrifugal-type, low RPM, open-port food grade pumps. Flow, pressure and TDS meters (not shown in any figures, but as also noted elsewhere) are placed in line after each pump to monitor conditions. The fresh solvent line 805 is connected to the base of every column between the booster pump 509 and an input into the transition section 302 between the two full port valves 501 and 505, allowing every column to become the "first" column as the extraction proceeds in a semi-continuous way. That supply line is plumbed using an external manifold to allow selected in-flow. Solvent supplied through pipe 805 can be delivered via a large VFD controlled pump (not shown) which can receive solvent that had previously been filtered and heated to the proper extraction temperature.

A rinse water drain connection 807 meant to work with the CIP system is present in the transition space between the lower screen valve 505 and the bottom valve 501. This drain outlet is intended to capture the liquid used during the CIP process after the spent solids have been expelled. This occurs when the bottom screen valve is open, but while the bottom-most valve is still closed and thereby helps to ensure the spent extractable materials are not re-wetted and can be more easily processed for fuel or other secondary uses.

Figure 8:
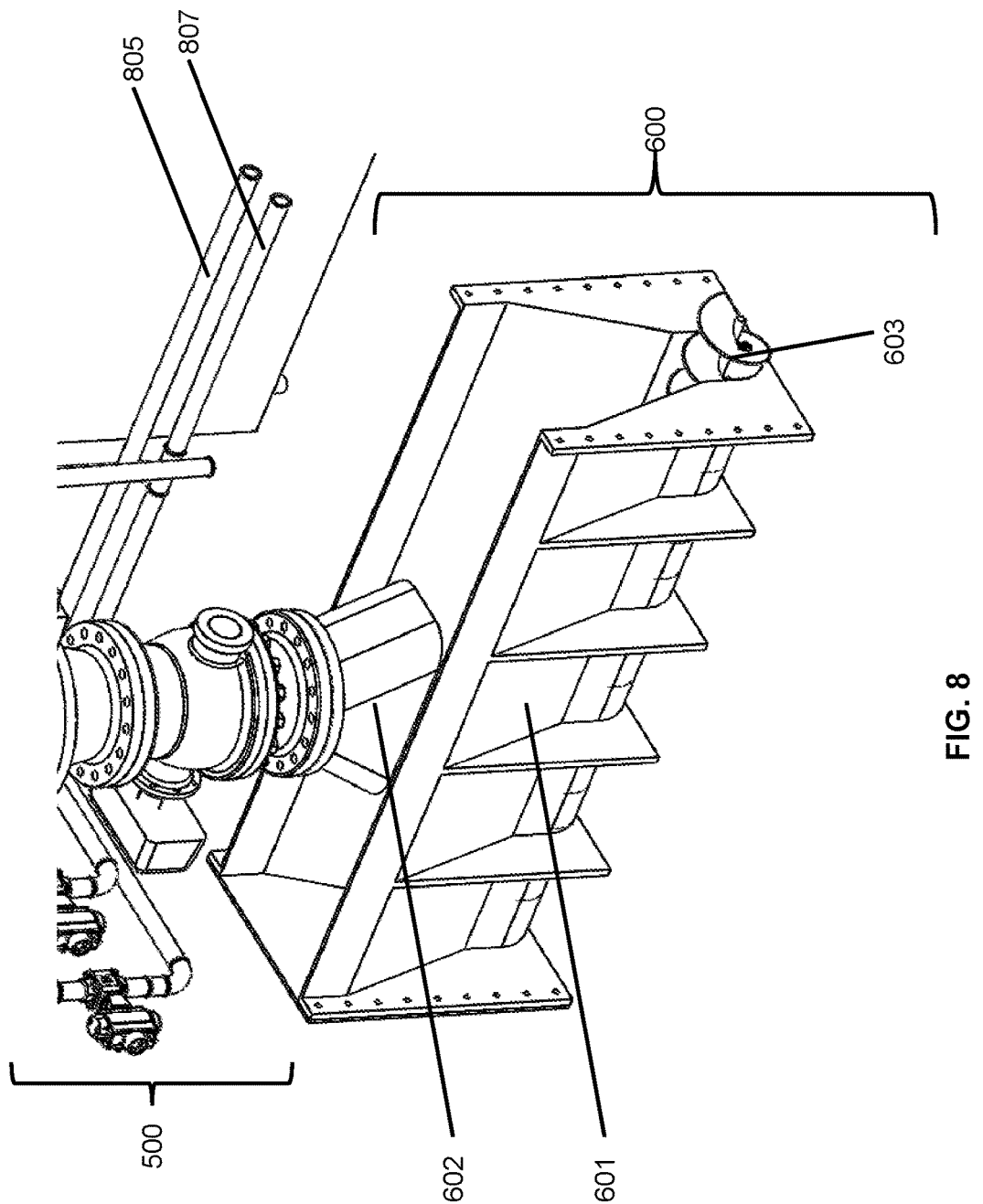
FIG. 8 is a perspective view of the lower section and the disposal auger system of the single column shown in FIG. 3, according to some embodiments.

FIG. 8 illustrates the configuration of the waste removal subsystem 600, according to some embodiments. FIG. 8 includes the trough 601, the funnel 602 and the waste auger 603. In practice, when valves 501 and 505 are opened and the waste extractable materials are discharged, they flow through the funnel 602 into the trough 601. The auger 603, by rotating in the proper direction, will transport these waste solids horizontally to the right (as oriented in FIG. 1) to a waste treatment system (not shown) to the side of the columns. There the waste solids can be further dried and prepared for export to landfill or to some other more beneficial use such as a combustion system for creating the heat needed for warming the extraction solvent.

Figure 10:
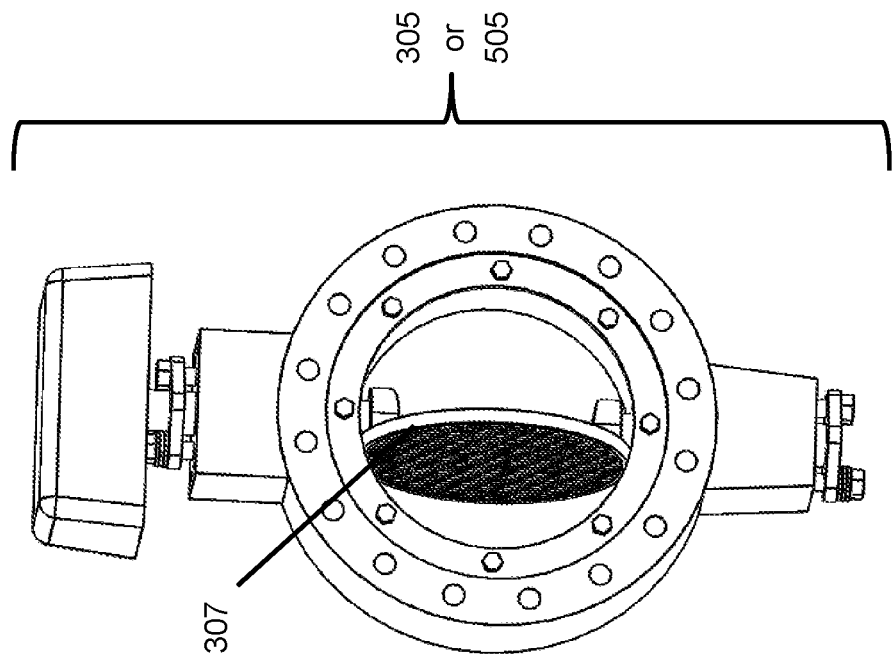
FIG. 10 is a perspective view of a butterfly valve that can be used in each column, wherein the valve plate is shown in the open position, according to some embodiments.
Figure 9:
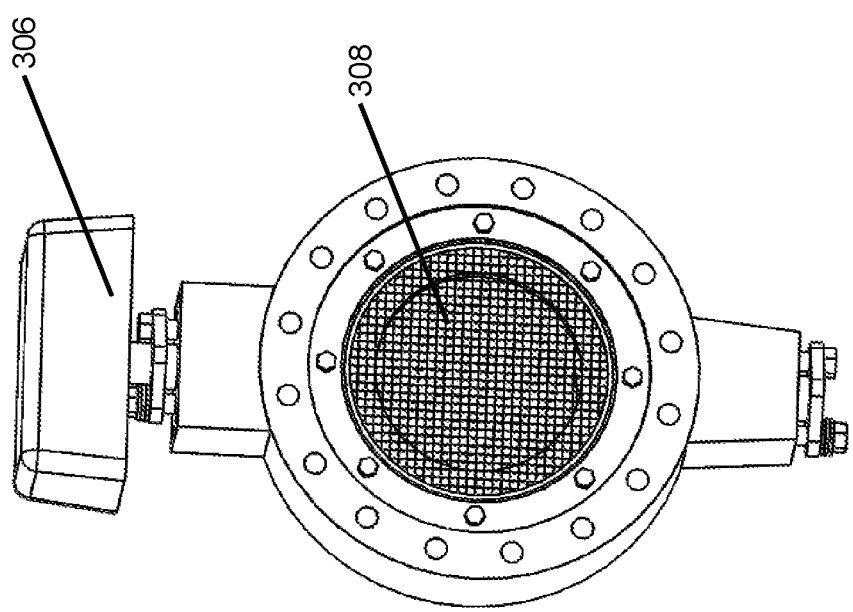
FIG. 9 is a perspective view of a butterfly valve that can be used in each column, wherein the valve plate or disk is shown in the closed position, according to some embodiments.

FIGS. 9 and 10 illustrate a butterfly valve that can be used in each column, according to some embodiments. FIGS. 9 and 10 illustrate internal features of, e.g., valves 305 from FIG. 5 and valves 505 from FIG. 6. The valve plate or disk 307 is shown in a closed position in FIG. 9 and in an open position in FIG. 10. This plate has been modified to remove a high percentage of its central body and then a special screen 308 has been attached to cover these openings. The screen 308 can be configured to allow fluids or gases to pass, regardless of whether it is in the open or closed position. The internal configuration shown in FIGS. 9 and 10 is illustrated for a butterfly valve, but it will be recognized that other embodiments can also be contemplated without departing from the techniques described herein. For example, some embodiments can incorporate ball valves and/or the like, to which a screen could be attached to modify the function of the valve from one of stopping all flowable compounds when closed to only stopping solids of a size selectable through the choice of a proper screen mesh when closed. As another example, butterfly and ball valves could be interchanged and other types of large, fast acting valves could be used instead.

Depending on the size of the mesh defining the screen 308, solids of a certain size can be stopped when the plate is in the closed position and allowed to flow when the plate is opened. For illustration purposes, the screen shown in FIG. 9 has a mesh size which is large (e.g., larger than in practice) in order to show the nature of this component, not to imply any required or preferred size. For example, for embodiments where the extractable materials loaded into the column is ground coffee, the screen size may be configured to be smaller than approximately 95-99% of the coffee grounds particles as measured by their smallest passable diameter. In some embodiments, particles which pass through this filter and are carried onward with the solvent and solute may be filtered out in other ways. For example, when they arrive at the next column, the mass of extractable materials packed into the next column will naturally filter a high percentage of these fine particles out of the flowing liquid. As another example, a multi-chamber or bag filtration system downstream of the columns and before the heat exchanger can be used to filter the fluid. As described herein, in some embodiments, elements of this filter system would be by-passable in order to prevent a clogged filter from stopping all flows.

Figure 11:
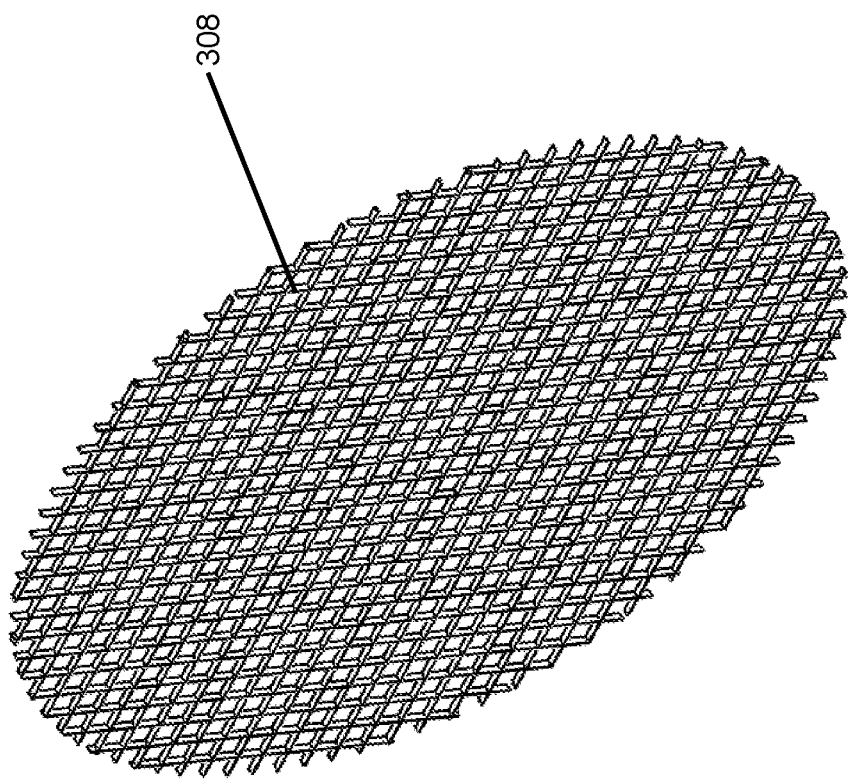
FIG. 11 is a perspective view of the screen material that can be incorporated into a butterfly valve, according to some embodiments.

FIG. 11 is another illustration of the screen 308. The size of the mesh is not representative of what is actually required to make this system function properly, but only to allow the general nature of the component to be shown. For illustrative purposes the screen 308 is shown magnified so that the screen has a fairly large mesh, but in actual size the screen openings are typically much smaller.

In some embodiments, at the very top and bottom of each individual column is a full-port ball valve 301 or 501 in close proximity to an oversized butterfly valve 305 or 505, the latter located inboard (toward the central container 401) of the ball valve. The butterfly valve 305 or 505 would be modified to incorporate a fine mesh screen 308, e.g. a Johnson-type screen, whose mesh size would be selected to efficiently filter the liquid extract from the solids in the system whilst in operation. There would also be a short space between each ball valve/butterfly valve pair to prevent interference of operations between the two and to provide a space for the auxiliary piping needed for the flow of solvent and extract between columns, introduction of MAP gases, CIP fluids, and drain lines.

In some embodiments, the upper-most and lower-most valves, 301 and 501, of a column 102 can be unmodified valves (e.g., valves without screens). The upper-most unmodified valve 301 can act as an inlet port for the granular extractable materials when open, and prevents the loss of fluids when closed. The lower-most un-modified valve 501 can act as a discharge port for spent solids when open and seals the extraction column from loss of fluids when closed.

The two inner valves (e.g., the valves nearest to and used for containing, controlling, and/or filtering the extractable materials) 305 and 505 can have their closure plates machined so that a filter screen could be welded or otherwise secured into place. This modified configuration can create a movable/rotatable filter that would be in-line when closed (thereby fulfilling its filtering function) and, when rotated 90 degrees to its open position, can be essentially out of the way of the flow, allowing easy discharge or reloading of solids.

The upper modified valve 305 (e.g., with the fine mesh screen or other suitable filter material), when in the closed position, can prevent transfer of extractable materials during normal operations, allowing separation of solids and liquid extract, acting as a filter of known porosity. When it is opened, it allows solids to enter the extraction column.

The lower modified valve 505 (e.g., with the fine mesh screen or other suitable filter material), when in the closed position, can prevent solids in the column from escaping the column due to gravity or internal pressure. It allows spent grinds to be evacuated when it is open.

In normal operation, the two lower valves 501 and 505 can be closed during solid granular filling, and the two upper valves 301 and 305 are open to allow filling. During an extraction operation, all four valves can be configured in the closed position.

During discharge of spent solids, the two bottom valves 501 and 505 can be opened to allow emptying of the column en mass, using a combination of gravity and/or pressure. Pressure can be applied by introducing a dry gas (such as nitrogen) rather than by re-wetting with wash water to achieve a fluid-enhanced discharge.

In some embodiments, using columns that are designed using the techniques described herein can allow ease of spent solids discharge without rewetting and also to allow easy/quick fresh solids replenishment as needed in an industrial setting.

As an example, the following illustration is provided, again using an embodiment of five columns 102A through 102E. Assuming all columns are empty and clean at the beginning of the setup process, the heat transfer jackets are employed to preheat each column to the desired operating temperatures. Both full-port bottom valves 501 and 505 are closed on each column and both top full-port valves 301 and 305 are open on all columns. All intermediate flow valves, MAP valves, and pressure pumps are closed and off.

All columns 102A through 102E are loaded with fresh extractable materials, starting with column 102A (for this start-up example), wherein the solids are filled from the bottom screen to approximately the level of the top screen in each column. In some embodiments the grind shape and size that may be practically and economically extracted may be chips or shards that range from ⅙ to 1/10 of a whole bean, a shape and size that is small enough to promote efficient extraction, while large enough to provide sufficient interstitial spacing for good wetting of all the grounds and the ability to maintain a uniform and consistent flow.

Then both top full-port valves 301 and 305 are closed on each column, thus sealing all columns. Column 102A's external solvent flow valve may now be opened, and fresh solvent (water, in the case of coffee extraction) flow may begin to the bottom of column 102A. The fresh solvent flow temperature, pressure and volume flow rate are controlled by the operator. Pressurizing the solvent can ensure that it can be forced around and into the core of the oversize grinds (as compared to the size normally utilized in making small doses in, for example, a café) needed to prevent the crushing of those same grinds due to the wetting and pressure of extraction and maintain interstitial space for unrestricted extract flow. In some embodiments the pressure may be varied between, for example, 75 and 125 PSI in a process that may be described as "breathing" wherein the intent is to push solvent into (with higher pressure) and relax solvent out of (with lower pressure) the properly prepared grinds. In this example, the solvent flows upwards into and thru column 102A, causing wetting of solids by both immersion of solids and pump pressure of solvent, against the closed outlet valve in the top of column 102A. When pressure conditions in column 102A reach the desired set point, the extract outlet valve (one of many illustrated as 304 or 504) is opened, allowing flow into column 102B's inlet valve, near the bottom of the column, which is also opened at this point, allowing solvent flow from the top of column 102A into the bottom of column 102B. The in-line pump 509 is used as needed to boost pressure loss from column 102A, creating similar or identical conditions of pressure and flow into the column 102B.

Flow is thus set up in sequence, bottom to top of each column, upwards thru the extractable materials, immersing and building pressure of extraction for thorough wetting in each column in the series. Pressure is maintained using the pumps to boost pressure as necessary to maintain flow rates column to column, until the ever richened solvent achieves the desired TDS for the extract, where upon it is discharged from the system, chilled in a plate-to-plate heat exchanger (or other suitable techniques), and stored in a tank with an inert gas over-blanket prior to packaging.

As each column in the series is determined by some economic or other criteria to be exhausted, it is taken off-line and out of the serial flow for venting and cleaning and refilling. Each spent column may be MAP gas purged of the water-of-wetting in an effort to dry the water-of-wetting from the spent solids. As each column becomes exhausted, it is isolated to be out-of-flow using the appropriate valves, and then cleaned and renewed while meanwhile making the column immediately downstream the new "first" column, the one receiving the strongest solvent. In some embodiments, an additional set of pipes can be used to collect extract from this dewatering process and send it to the next column in line (e.g., rather than to the drain).

Each column in the series receives solute from the previous tank with an ever-greater TDS extract value. Coincidentally with this, the solvent power of the liquid steadily decreases, but the conditions of extraction temperature and pressure are controlled identically column-to-column using jacket heaters and intermediate pumps.

The speed of extraction (the time that the grounds are exposed to the solvent, the temperature of the solvent, etc.) can be important so as to neither under-extract nor over-extract (including conditions which hydrolyze cellulose). Proper coffee extraction is complex, but the design of the described multi-chamber system provides excellent control of all the necessary parameters, and the ability to orchestrated these parameters simultaneously, to optimize extraction and thereby yield a very high quality coffee product.

As can be seen, the control of inlet/outlet valves for solvent to extract flow with pump and temperature equalization will, in some embodiments, be controlled automatically to get the most consistent results possible.

All columns are closed to atmosphere during use. Dry solids enter the top during recharging; damp solids exit the bottom during dumping; and conditions of controlled extraction are maintained, column-to-column, in a series of any length desired. For example, exposure of the extractable materials (prior to being discharged to waste) or the extract itself to oxygen is intentionally minimized as much as possible during every step of the operation.

Various modifications to the disclosed embodiments will be apparent to those skilled in the art, and the general principles set forth herein may be applied to other embodiments and applications. Thus, the present techniques are not intended to be limited to the embodiments shown or described herein.

The invention claimed is:

1. A reconfigurable extraction apparatus, comprising:
   a plurality of columns, wherein at least one of the columns of the plurality of columns comprises:
   a central portion configured to hold extractable material during an extraction process;
   an extractable material outlet configured to discharge exhausted extraction material out of the column; and
   an extractable material inlet configured to provide the extractable material into the column, wherein the extractable material inlet of the column comprises a set of inlet valves including a first inlet valve and a second inlet valve, and the first inlet valve is disposed inwards towards the central portion of the column and the second inlet valve is disposed outside of the first inlet valve such that the second inlet valve is further away from the central portion than the first inlet valve, and wherein the first inlet valve and the second inlet valve can both be configured in an open position to fill the column with a predetermined amount of the extractable material; and
   a piping system connected to each of the plurality of columns, wherein the piping system is configured to provide for:
   selectively connecting each of the plurality of columns, such that each column from the plurality of columns can be configured for an extraction process either singularly or in series or in parallel with one or more other columns from the plurality of columns;
   administering a solvent to one or more of the plurality of columns; and
   outputting the solvent after the extraction process occurs in the one or more of the plurality of columns.

2. The reconfigurable extraction apparatus of claim 1, wherein the plurality of columns are configured vertically such that, for each column from the plurality of columns, a solvent inlet into the column is disposed at the top of the column and a solvent outlet is disposed at the bottom of the column such that the solvent can flow through the column from the top of the column to the bottom of the column.

3. The reconfigurable extraction apparatus of claim 1, wherein the plurality of columns are configured vertically such that, for each column from the plurality of columns, a solvent inlet into the column is disposed at the bottom of the column and a solvent outlet is disposed at the top of the column such that the solvent can flow through the column from the bottom of the column to the top of the column.

4. The reconfigurable extraction apparatus of claim 1, wherein columns of the plurality of columns are configured horizontally, at some angle between horizontal and vertical, or both.

5. The reconfigurable extraction apparatus of claim 1, wherein each column of the plurality of columns includes a water jacket disposed about the column to provide temperature control of the extraction process.

6. The reconfigurable extraction apparatus of claim 1, wherein the extractable material outlet of at least one of the columns of the plurality comprises a set of outlet valves, wherein the set of valves comprises a first outlet valve and a second outlet valve, wherein the first outlet valve is disposed inwards towards the central portion of the column and the second outlet valve is disposed outside of the first outlet valve such that the second outlet valve is further away from the central portion than the first outlet valve.

7. The reconfigurable extraction apparatus of claim 6, wherein the first outlet valve and the second outlet valve of the at least one of the columns of the plurality can both be configured in an open position to discharge the extractable material from the column.

8. The reconfigurable extraction apparatus of claim 1, wherein the piping system can be configured to isolate a column of the plurality of columns after the column to be isolated has been used in an extraction process so that the column to be isolated can be cleaned in place while other columns of the plurality of columns can still be used in the extraction process.

9. The reconfigurable extraction apparatus of claim 1, wherein the piping system can be configured to
   input the solvent that is output from the one or more of the plurality of columns after the extraction process occurs in the one or more columns into a different column of the plurality of columns.

10. The reconfigurable extraction apparatus of claim 1, wherein:
    a first set of the plurality of columns is configured vertically such that, for each column from the first set of columns, a solvent inlet into the column is disposed at the top of the column and a solvent outlet is disposed at the bottom of the column such that the solvent can flow through the column from the top of the column to the bottom of the column; and
    a second set of the plurality of columns, different than the first set, is configured vertically such that, for each column from the second set of columns, a solvent inlet into the column is disposed at the bottom of the column and a solvent outlet is disposed at the top of the column such that the solvent can flow through the column from the bottom of the column to the top of the column.

11. The reconfigurable extraction apparatus of claim 1, wherein the extractable material inlet of each column of the plurality has a corresponding set of inlet valves including a corresponding first inlet valve and a corresponding second inlet valve, and each first inlet valve of a corresponding set is disposed inwards towards the central portion of the column and each second inlet valve of the corresponding set is disposed outside of the first inlet valve such that the second inlet valve is further away from the central portion than the first inlet valve.

12. The reconfigurable extraction apparatus of claim 11, wherein the extractable material outlet of each column of the plurality has a corresponding set of outlet valves including a corresponding first outlet valve and a corresponding second outlet valve, and each first outlet valve of a corresponding set is disposed inwards towards the central portion of the column and each second outlet valve of the corresponding set is disposed outside of the first outlet valve such that the second outlet valve is further away from the central portion than the first outlet valve.

13. The reconfigurable extraction apparatus of claim 1, wherein the first inlet valve of the set of inlet valves comprises a valve member, the valve member having an open position and a closed position, and wherein the valve member includes a screen configured to prevent solids larger than a predetermined size from passing through the first inlet valve while allowing fluids to pass through the first inlet valve when the valve member is in the closed position.

14. The reconfigurable extraction apparatus of claim 1, wherein the extractable material outlet of each column of the plurality has a corresponding set of outlet valves including a corresponding first outlet valve and a corresponding second outlet valve, and each first outlet valve of a corresponding set is disposed inwards towards the central portion of the column and each second outlet valve of the corresponding set is disposed outside of the first outlet valve such that the second outlet valve is further away from the central portion than the first outlet valve.

15. The reconfigurable extraction apparatus of claim 6, wherein at least one column of the plurality that has the set of inlet valves also has the set of outlet valves.

16. The reconfigurable extraction apparatus of claim 15, wherein:
the first inlet valve of the set of inlet valves comprises an inlet valve member;
the inlet valve member has an open position and a closed position;
the inlet valve member includes an inlet screen configured to prevent solids larger than a first predetermined size from passing through the first inlet valve while allowing fluids to pass through the first inlet valve when the inlet valve member is in the closed position;
the first outlet valve of the set of outlet valves comprises an outlet valve member;
the outlet valve member has an open position and a closed position; and
the outlet valve member includes an outlet screen configured to prevent solids larger than a second predetermined size from passing through the first outlet valve while allowing fluids to pass through the first outlet valve when the outlet valve member is in the closed position.

17. The reconfigurable extraction apparatus of claim 16, wherein the first predetermined size and the second predetermined size are the same.

18. A reconfigurable extraction apparatus, comprising:
a plurality of columns, wherein at least one of the columns of the plurality of columns comprises:
an extractable material inlet configured to provide extractable material into the column;
a central portion configured to hold the extractable material during an extraction process; and
an extractable material outlet configured to discharge exhausted extractable material out of the column, wherein the extractable material outlet of the column comprises a set of outlet valves including a first outlet valve and a second outlet valve, and the first outlet valve is disposed inwards towards the central portion of the column and the second outlet valve is disposed outside of the first outlet valve such that the second outlet valve is further away from the central portion than the first outlet valve and wherein the first outlet valve and the second outlet valve can both be configured in an open position to discharge the extractable material from the column; and
a piping system connected to each of the plurality of columns, wherein the piping system is configured to provide for:
selectively connecting each of the plurality of columns, such that each column from the plurality of columns can be configured for an extraction process either singularly or in series or in parallel with one or more other columns from the plurality of columns;
administering a solvent to one or more of the plurality of columns; and
outputting the solvent after the extraction process occurs in the one or more of the plurality of columns.

19. The reconfigurable extraction apparatus of claim 18, wherein the extractable material inlet of each column of the plurality has a corresponding set of inlet valves including a corresponding first inlet valve and a corresponding second inlet valve, and each first inlet valve of a corresponding set is disposed inwards towards the central portion of the column and each second inlet valve of the corresponding set is disposed outside of the first inlet valve such that the second inlet valve is further away from the central portion than the first inlet valve.

20. The reconfigurable extraction apparatus of claim 18, wherein the first outlet valve of the set of outlet valves comprises a valve member, the valve member having an open position and a closed position, and wherein the valve member includes a screen configured to prevent solids larger than a predetermined size from passing through the first outlet valve while allowing fluids to pass through the first outlet valve when the valve member is in the closed position.

* * * * *